United States Patent
Cain et al.

(10) Patent No.: US 11,295,899 B2
(45) Date of Patent: Apr. 5, 2022

(54) SYSTEM AND METHOD FOR CONTROLLING A VOLTAGE TUNABLE MULTILAYER CAPACITOR

(71) Applicant: AVX Corporation, Fountain Inn, SC (US)

(72) Inventors: Jeffrey Cain, Greenville, SC (US); Joseph M. Hock, Surfside Beach, SC (US)

(73) Assignee: KYOCERA AVX Components Corporation, Fountain Inn, SC (US)

( * ) Notice: Subject to any disclaimer, the term of this patent is extended or adjusted under 35 U.S.C. 154(b) by 83 days.

(21) Appl. No.: 16/720,069

(22) Filed: Dec. 19, 2019

(65) Prior Publication Data
US 2020/0211783 A1    Jul. 2, 2020

Related U.S. Application Data

(60) Provisional application No. 62/784,879, filed on Dec. 26, 2018.

(51) Int. Cl.
| | |
|---|---|
| *H01G 7/06* | (2006.01) |
| *H01G 4/005* | (2006.01) |
| *H01G 4/12* | (2006.01) |
| *H01G 4/30* | (2006.01) |

(52) U.S. Cl.
CPC ............... *H01G 7/06* (2013.01); *H01G 4/005* (2013.01); *H01G 4/12* (2013.01); *H01G 4/30* (2013.01)

(58) Field of Classification Search
CPC  H01G 7/06; H01G 4/005; H01G 4/12; H01G 4/30
See application file for complete search history.

(56) References Cited

U.S. PATENT DOCUMENTS

| | | |
|---|---|---|
| 3,809,971 A | 5/1974 | Hluchan et al. |
| 5,472,935 A | 12/1995 | Yandrosfski et al. |
| 5,589,845 A | 12/1996 | Yandrofski et al. |
| 5,986,864 A | 11/1999 | Davis |
| 6,187,061 B1 | 2/2001 | Amatucci et al. |
| 6,377,142 B1 | 4/2002 | Chiu et al. |
| 6,493,207 B2 | 12/2002 | Nakano et al. |
| 6,514,895 B1 | 2/2003 | Chiu et al. |
| 6,683,782 B2 | 1/2004 | Duva |
| 6,727,535 B1 | 4/2004 | Sengupta et al. |
| 6,737,179 B2 | 5/2004 | Sengupta |

(Continued)

OTHER PUBLICATIONS

Abstract of Japanese Patent—JPH0878285, Mar. 22, 1996, 2 pages.

(Continued)

*Primary Examiner* — Dion R. Ferguson
(74) *Attorney, Agent, or Firm* — Dority & Manning, P.A.

(57) ABSTRACT

A controller and system for tuning a voltage tunable capacitor is provided. The controller may include at least one analog-to-digital converter configured to receive at least one input signal and convert the at least one input signal into at least one digital signal. The controller may include a processor configured to process the at least one digital signal using logic to generate an output signal. The controller may include a charge pump configured to boost the output signal to generate a boosted output signal. The controller may be configured to provide the boosted output signal to the voltage tunable capacitor to adjust a bias voltage of the voltage tunable capacitor.

26 Claims, 24 Drawing Sheets

(56) References Cited

U.S. PATENT DOCUMENTS

| | | |
|---|---|---|
| 6,774,077 B2 | 8/2004 | Sengupta et al. |
| 6,905,989 B2 | 6/2005 | Ellis et al. |
| 6,999,302 B2 | 2/2006 | Ito et al. |
| 7,145,415 B2 | 12/2006 | Sengupta et al. |
| 7,329,976 B2 | 2/2008 | Shirasu et al. |
| 7,393,604 B2 | 7/2008 | Rocke et al. |
| 7,557,055 B2 | 7/2009 | Zhang et al. |
| 7,738,237 B2 | 6/2010 | Lee |
| 7,869,187 B2 | 1/2011 | McKinzie, III |
| 7,893,561 B2 | 2/2011 | Weidenheimer et al. |
| 7,936,553 B2 | 5/2011 | Oakes et al. |
| 8,009,407 B2 | 8/2011 | Leidl et al. |
| 8,112,852 B2 | 2/2012 | Mendolia et al. |
| 8,243,417 B2 | 8/2012 | Kanno et al. |
| 8,354,166 B2 | 1/2013 | Tan et al. |
| 8,699,204 B2 | 4/2014 | Demcko et al. |
| 8,891,226 B2 | 11/2014 | Lee et al. |
| 9,001,486 B2 | 4/2015 | Anthony et al. |
| 9,019,679 B2 | 4/2015 | Anthony et al. |
| 9,041,491 B2 | 5/2015 | Sato et al. |
| 9,047,524 B2 | 6/2015 | Ikemoto et al. |
| 9,318,266 B2 | 4/2016 | Capanu et al. |
| 9,390,857 B2 | 7/2016 | Tan et al. |
| 9,397,632 B2 | 7/2016 | Tan et al. |
| 9,627,141 B2 | 4/2017 | Engel et al. |
| 9,633,786 B2 | 4/2017 | Hattori |
| 9,646,766 B2 | 5/2017 | Ma et al. |
| 9,728,340 B2 | 8/2017 | Ishii et al. |
| 9,819,064 B2 | 11/2017 | Jiang et al. |
| 9,859,843 B2 | 1/2018 | Charley et al. |
| 9,991,597 B2 | 6/2018 | Velandia Torres |
| 10,276,308 B2 | 4/2019 | Charley |
| 10,431,388 B2 | 10/2019 | Ritter et al. |
| 2002/0149434 A1* | 10/2002 | Toncich ............... H01G 7/06 331/158 |
| 2004/0175585 A1 | 9/2004 | Zou et al. |
| 2004/0178867 A1 | 9/2004 | Rahman et al. |
| 2007/0030100 A1 | 2/2007 | Rhaman et al. |
| 2008/0068801 A1 | 3/2008 | Wilk |
| 2008/0106350 A1* | 5/2008 | McKinzie ............. H01Q 1/50 333/17.3 |
| 2008/0199737 A1 | 8/2008 | Kazaryan et al. |
| 2010/0188799 A1 | 7/2010 | Galvagni et al. |
| 2013/0286534 A1 | 10/2013 | Ikehachi et al. |
| 2014/0206296 A1* | 7/2014 | Chakraborty ........... H04B 1/18 455/77 |
| 2014/0247534 A1 | 9/2014 | Sato et al. |
| 2016/0268052 A1 | 9/2016 | Gando et al. |
| 2017/0229917 A1* | 8/2017 | Kurs ................... H03K 17/284 |
| 2018/0190436 A1 | 7/2018 | Duwel et al. |
| 2019/0080851 A1* | 3/2019 | Nies ..................... H01G 7/06 |
| 2019/0103228 A1* | 4/2019 | Nies ..................... H01G 7/06 |
| 2020/0006007 A1 | 1/2020 | Ritter et al. |
| 2020/0211783 A1* | 7/2020 | Cain .................... H01G 7/06 |

OTHER PUBLICATIONS

Abstract of Japanese Patent—JP2008066682, Mar. 21, 2008, 2 pages.
Abstract of Japanese Patent—JP2017127081, Jul. 20, 2017, 1 page.
Abstract of WO2015001222 (A1), Jan. 8, 2015, 2 pages.
Product Information—TurboCap™ High-CV SMPS Capacitors from AVX Corporation, May 2015, 3 pp. 49-51.
International Search Report and Written Opinion for PCT/US2019/067385 dated Apr. 17, 2020, 12 pages.
Dielectric Properties and Ferroelectric Phase Transition of Non-linear Tunable Barium Calcium Tin Titanate Ceramic, by Gu Huihua, Chinese Doctoral Dissertations/Masters' Theses Full-text Database (Master) Engineering Science and Technology I, Edition 09, 2006, 5 pages.

* cited by examiner

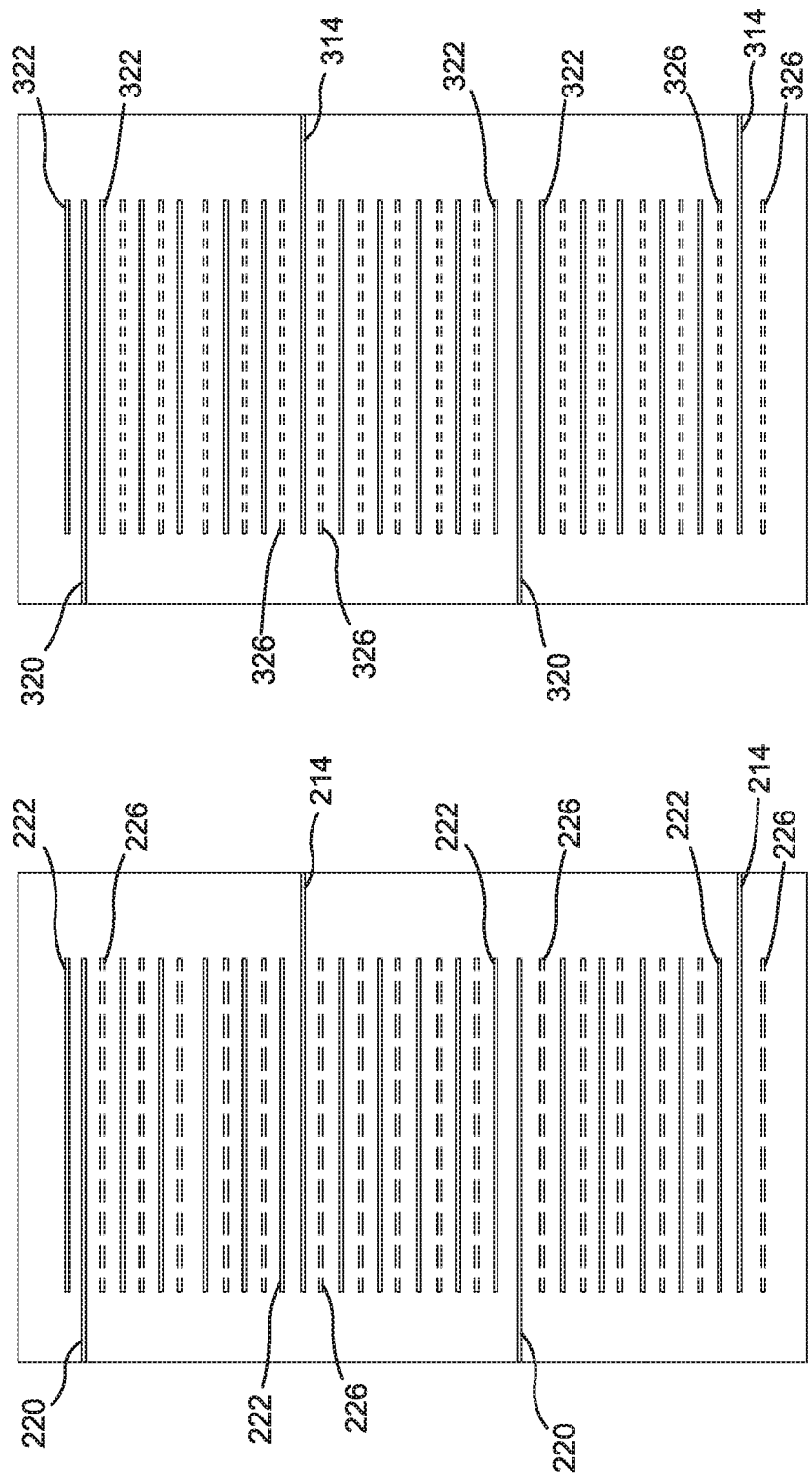

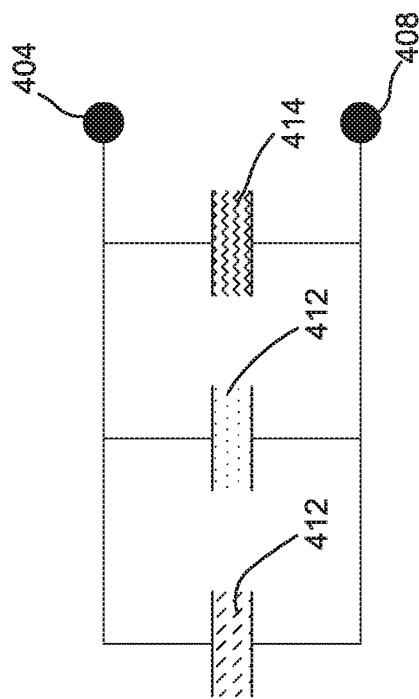
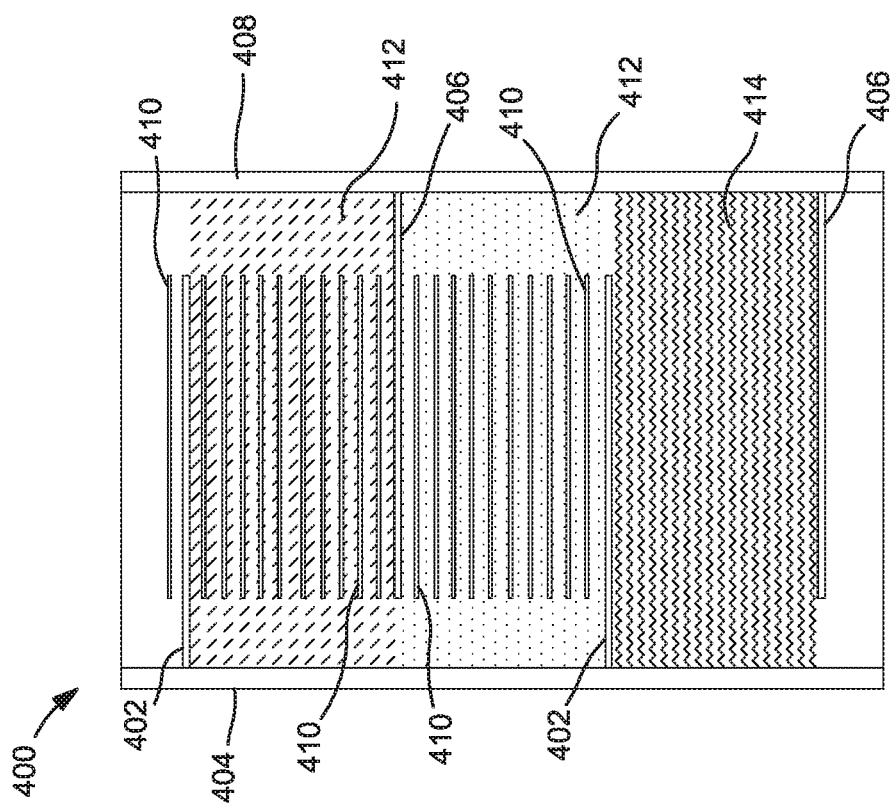
FIG. 13B
FIG. 13A

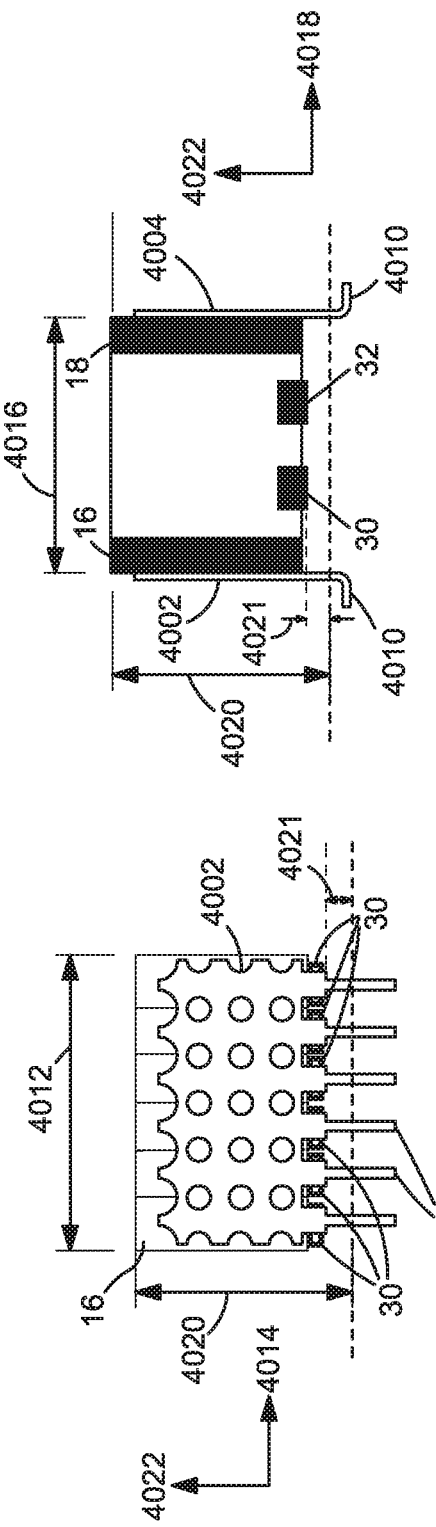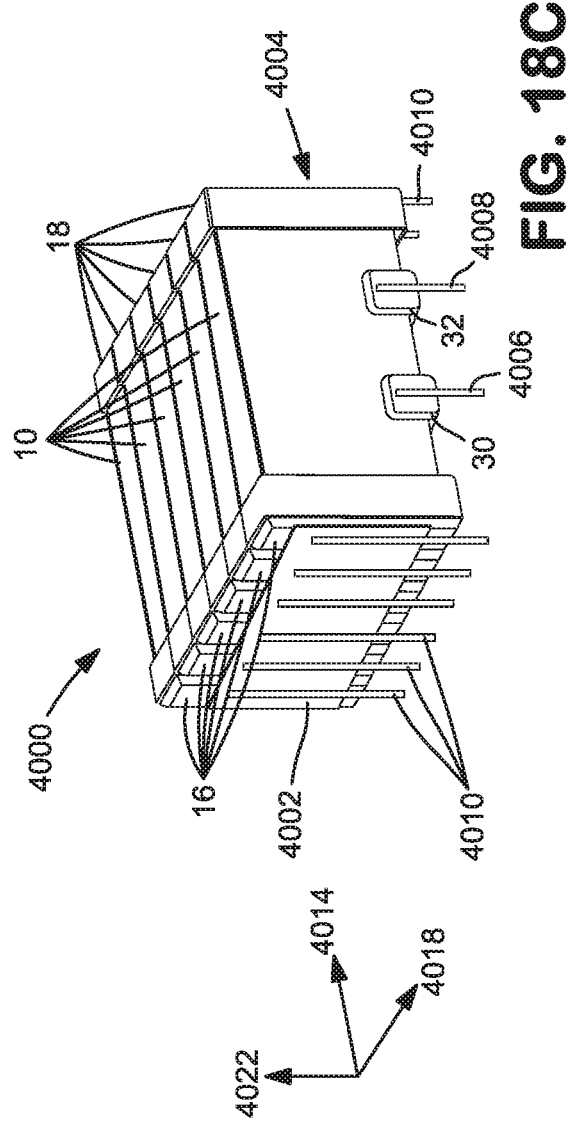

SYSTEM AND METHOD FOR CONTROLLING A VOLTAGE TUNABLE MULTILAYER CAPACITOR

CROSS REFERENCE TO RELATED APPLICATION

The present application claims filing benefit of U.S. Provisional Patent Application Ser. No. 62/784,879 having a filing date of Dec. 26, 2018, which is incorporated herein by reference in its entirety.

BACKGROUND OF THE INVENTION

Tunable capacitors have been proposed in various applications that rely on the variable dielectric properties of the dielectric. For such capacitors, the capacitance at zero bias is typically near its maximum and the capacitance drops with applied voltage. The change in capacitance allows these units to be used to create tunable circuits in filters, matching networks, resonant circuits and other applications from audio to RF and microwave frequencies. Despite their benefits, the use of such capacitors has been relatively limited due in part to the relatively low capacitance values achieved at high power and voltage levels. Furthermore, circuits employing voltage tunable multilayer capacitors would benefit from a system and method for controlling the voltage tunable multilayer capacitor.

SUMMARY OF THE INVENTION

One example embodiment of the present disclosure is directed to a controller for tuning a voltage tunable capacitor. The controller may include at least one analog-to-digital converter configured to receive at least one input signal and convert the at least one input signal into at least one digital signal. The controller may include a processor configured to process the at least one digital signal using logic to generate an output signal. The controller may include a charge pump configured to boost the output signal to generate a boosted output signal. The controller may be configured to provide the boosted output signal to the voltage tunable capacitor to adjust a bias voltage of the voltage tunable capacitor.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

A full and enabling disclosure of the present invention, including the best mode thereof, directed to one of ordinary skill in the art, is set forth more particularly in the remainder of the specification, which makes reference to the appended Figures in which:

FIG. 12A illustrates a sectional view of an exemplary embodiment of an 11:1 ratio non-shielded asymmetric design of a biased multilayer capacitor in accordance with presently disclosed subject matter;

FIG. 12B illustrates a sectional view of an exemplary embodiment of an 11:1 ratio shielded asymmetric design of a biased multilayer capacitor in accordance with presently disclosed subject matter;

FIGS. 13A and 13B illustrate, respectively, a sectional view and a schematic diagram of an exemplary embodiment of a partially tunable multilayer capacitor in accordance with presently disclosed subject matter;

FIGS. 18A through 18C illustrate, respectively, a side view, a front view, and a perspective view of an embodiment of a tunable multilayer capacitor array in accordance with aspects of the presently disclosed subject matter.

Figure 1:
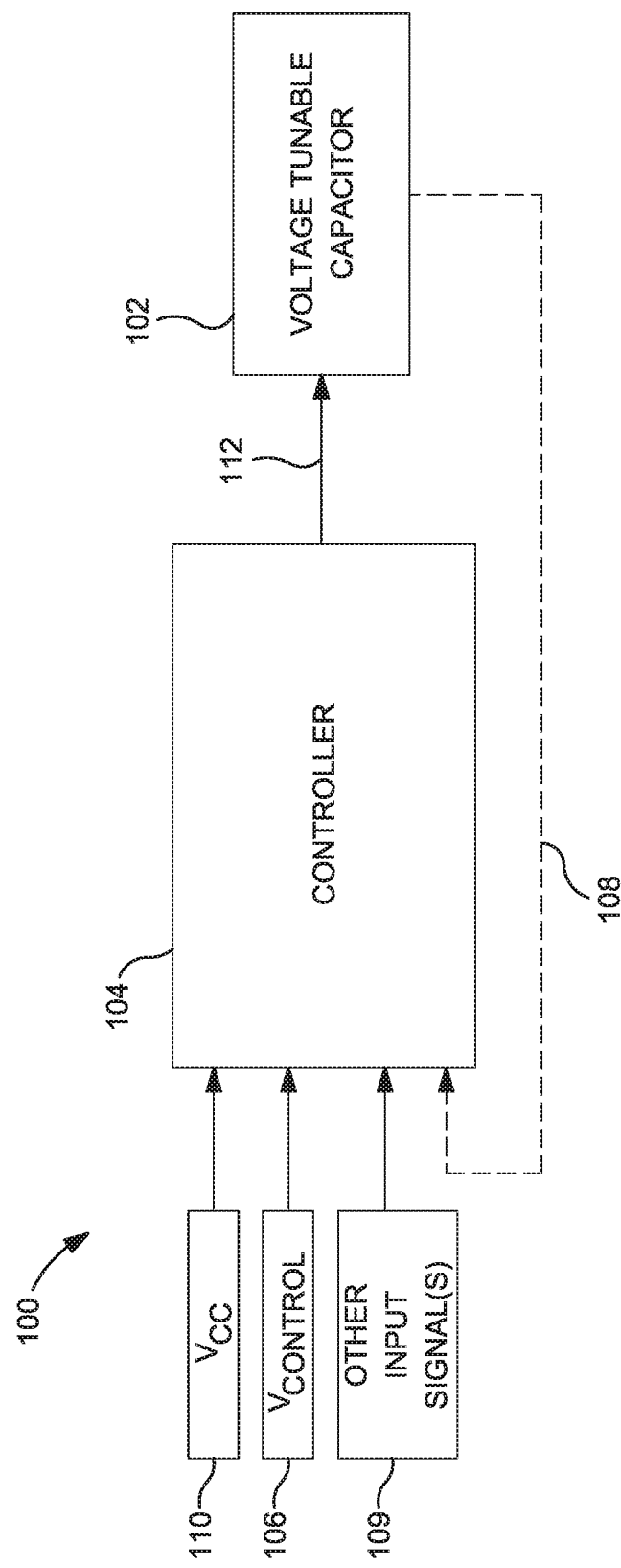
FIG. 1 illustrates an embodiment of a system for tuning a voltage tunable capacitor according to aspects of the present disclosure.

Repeat use of reference characters throughout the present specification and appended drawings is intended to represent same or analogous features, elements, or steps thereof.

DETAILED DESCRIPTION OF THE INVENTION

It is to be understood by one of ordinary skill in the art that the present discussion is a description of exemplary embodiments only, and is not intended as limiting the broader aspects of the present invention, which broader aspects are embodied in the exemplary construction.

Generally speaking, the present disclosure is directed to a system and method for tuning a voltage tunable capacitor. The voltage tunable capacitor may be configured for relatively high operating voltages. In some implementations, a controller may be configured to tune the voltage tunable capacitor based on one or more input signals that have relatively low voltages. Thus, the controller may allow the voltage tunable capacitor to be implemented in circuits in which providing high voltage input signals and/or bias voltages is difficult or impractical. The controller may allow for voltage tunable capacitors to be employed in a greater variety of applications, including those involving relatively high voltages.

In some embodiments, the controller may include at least one analog-to-digital converter configured to receive at least one input signal and convert the at least one input signal into at least one digital signal. The controller may include a processor configured to process the at least one digital signal using logic to generate an output signal. The controller may include a charge pump configured to boost the output signal to generate a boosted output signal. The controller may be configured to provide the boosted output signal to the voltage tunable capacitor to adjust a bias voltage of the voltage tunable capacitor.

In some embodiments, the boosted output signal may adjust a capacitance of the voltage tunable capacitor. For example, the controller may be configured to provide a boosted output signal that ranges from about 0 volts to at least about 500 volts, in some embodiments to at least about 300 volts, in some embodiments to at least about 200 volts, in some embodiments to at least about 100 volts, in some embodiments to at least about 70 volts, in some embodiments to at least about 50 volts, in some embodiments to at least about 30 volts, and in some embodiments to at least about 20 volts.

In some embodiments, the input signal(s) may include a variety of suitable signals. As examples, the input signal(s) may be indicative of a voltage, current, capacitance, temperature and/or other suitable parameter associated with the voltage tunable capacitor. For instance, the input signal(s) may be indicative of the capacitance of the voltage tunable capacitor (e.g., to provide closed-loop control over the capacitance of the voltage tunable capacitor).

In some embodiments, the input signal(s) may be indicative of a voltage, current, capacitance, temperature and/or other suitable parameter associated with a circuit that includes or is otherwise connected or associated with the voltage tunable capacitor. For instance, the input signal(s) may be indicative of a temperature of a component (e.g., a heat sink or other temperature-critical component) of a circuit associated with the voltage tunable capacitor. As another example, the input signal(s) may be indicative of a desired output voltage or current of the circuit.

The input signal(s) may range from about 0 volts to at least about 20 volts, in some embodiments to at least about 15 volts, in some embodiments to at least about 10 volts, in some embodiments to at least about 7 volts, in some embodiments to at least about 5 volts, and in some embodiments to at least about 3 volts.

A ratio of an upper limit of the bias voltage of the voltage tunable capacitor to an upper limit of the voltage of the input signal may range from about 1 to about 500, or greater, in some embodiments from about 1 to about 250, in some embodiments from about 1 to about 150, in some embodiments from about 1 to about 100, in some embodiments from about 1 to about 75, in some embodiments from about 1 to about 50, in some embodiments from about 1 to about 20, in some embodiments from about 1 to about 10, and in some embodiments from about 1 to about 5.

In some embodiments, the input signal(s) may be indicative of a manual control signal that is indicative of a desired capacitance associated with the voltage tunable capacitor or a desired voltage associated with the voltage tunable capacitor. The manual control signal may range from about 0 volts to at least about 3 volts, in some embodiments from about 0 volts to at least about 2 volts, in some embodiments from about 0 volts to at least about 1 volts, from about 0 volts to at least about 0.5 volts, and in some embodiments from about 0 volts to at least about 0.1 volts.

A ratio of an upper limit of the bias voltage of the voltage tunable capacitor to an upper limit of the manual control signal may range from about 1 to about 500, or greater, in some embodiments from about 1 to about 250, in some embodiments from about 1 to about 150, in some embodiments from about 1 to about 100, in some embodiments from about 1 to about 75, in some embodiments from about 1 to about 50, in some embodiments from about 1 to about 20, in some embodiments from about 1 to about 16, and in some embodiments from about 1 to about 10.

In some embodiments, one or more components of the system for controlling the voltage tunable capacitor may be assembled in a monolithic device. For example, the controller may be sealed in a molding material or packaging to form the monolithic device. In some embodiments, the analog-to-digital converter(s) and/or the charge pump may be assembled in the monolithic device. The monolithic device may include external terminations for electrically connecting the controller and tunable capacitor with inputs, the voltage tunable capacitor, and/or other electrical components. The monolithic device may be configured for surface mounting to a printed circuit board.

The charge pump may be any suitable type of voltage boosting device (e.g., a DC-to-DC converter). For example, the charge pump may employ rapid switching of alternating currents to produce the boosted output signal. The charge pump may be free of an inductor. The boosted output signal of the charge pump may be positively correlated with a DC voltage received by the charge pump. In other words, the charge pump may be configured to boost the DC voltage received by the charge pump by a linear gain and/or according to a non-decreasing function. For example, the charge pump may be configured to boost the DC voltage received by the charge pump by a factor or gain of 2 or greater (e.g., a "doubling" charge pump), in some embodiments 4 or greater, in some embodiments 8 or greater, and in some embodiments 16 or greater.

Aspects of the present disclosure are directed to a system for tuning a voltage tunable capacitor. The system may include one or more control devices (e.g., controller(s)). The control device(s) may include a charge pump. The system may include a voltage tunable capacitor that includes a plurality of active electrodes, a plurality of bias electrodes, and a plurality of dielectric layers disposed between the pluralities of active electrodes and bias electrodes. At least some of the dielectric layers may contain a tunable dielectric material that exhibits a variable dielectric constant upon the application of an applied voltage. The control device(s) may be configured to receive at least one input signal. The control device(s) may be configured to process the input signal(s) to generate an output signal using logic. The control device(s) may be configured to boost the output signal using the charge pump. The control device(s) may be configured to provide the boosted output signal to the voltage tunable capacitor to adjust a bias voltage applied across the plurality of bias electrodes.

The voltage tunable capacitor may be or include a multilayer capacitor. The multilayer voltage tunable capacitor includes a plurality of dielectric layers interposed between alternating active electrode layers. At least a portion of the dielectric layers may include a tunable material that exhibits a variable dielectric constant upon the application of an applied voltage. More particularly, such materials typically have a "voltage tunability coefficient" within the range of from about 10% to about 90%, in some embodiments from about 20% to about 80%, and in some embodiments, from about 30% to about 70%, wherein the "voltage tunability coefficient" is determined according to the following general equation:

$$T=100\times(\varepsilon_0-\varepsilon_V)/\varepsilon_0$$

wherein,

T is the voltage tunability coefficient;

$\varepsilon_0$ is the static dielectric constant of the material without an applied voltage; and $\varepsilon_V$ is the variable dielectric constant of the material after application of the applied voltage (DC).

The static dielectric constant of the material typically ranges from about 100 to about 25,000, in some embodiments from about 200 about 10,000, and in some embodiments, from about 500 to about 9,000, such as determined in accordance with ASTM D2149-13 at operating temperatures ranging from about −55° C. to about 150° C. (e.g., 25° C.) and frequencies ranging from about 100 Hz to about 1 GHz (e.g., 1 kHz). Of course, it should be understood that the specific value of the static dielectric constant is generally selected based on the particular application for which the capacitor is employed. When applied with an increased DC bias, the dielectric constant generally decreases within the ranges noted above. The tuning voltage applied to induce the desired change in dielectric constant may generally vary relative to the voltage at which the dielectric composition begins to become conductive upon application of an electric field ("breakdown voltage"), which can be determined in accordance with ASTM D149-13 at a temperature of 25° C. In most embodiments, a maximum applied DC bias voltage is about 50% or less, in some embodiments, about 30% or less, and in some embodiments, from about 0.5% to about 10% of the breakdown voltage of the dielectric composition.

Figure 14:
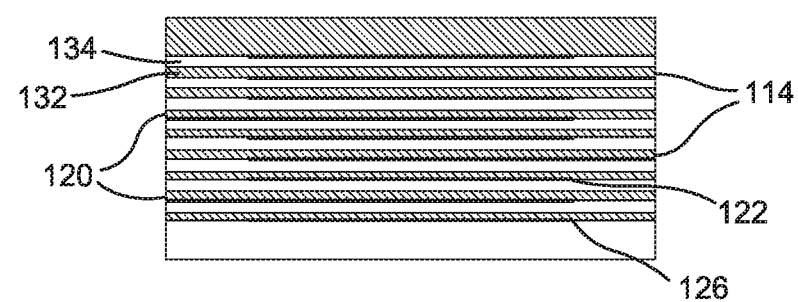
FIG. 14 illustrates a sectional view of an exemplary embodiment of a compositionally blended biased multilayer capacitor in accordance with presently disclosed subject matter.

Any of a variety of tunable dielectric materials may generally be employed as is known in the art. Particularly suitable materials are dielectrics whose base composition includes one or more ferroelectric base phases, such as perovskites, tungsten bronze materials (e.g., barium sodium niobate), layered structure materials (e.g., bismuth titanate). Suitable perovskites may include, for instance, barium titanate and related solid solutions (e.g., barium-strontium titanate, barium calcium titanate, barium zirconate titanate, barium strontium zirconate titanate, barium calcium zirconate titanate, etc.), lead titanate and related solid solutions (e.g., lead zirconate titanate, lead lanthanum zirconate titanate), sodium bismuth titanate, and so forth. In one particular embodiment, for instance, barium strontium titanate ("BSTO") of the formula $Ba_xSr_{1-x}TiO_3$ may be employed, wherein x is from 0 to 1, in some embodiments from about 0.15 to about 0.65, and in some embodiments, from about from 0.25 to about 0.6. Other electronically tunable dielectric materials may be used partially or entirely in place of barium strontium titanate. For instance, one example is $Ba_xCa_{1-x}TiO_3$, wherein x is from about 0.2 to about 0.8, and in some embodiments, from about 0.4 to about 0.6. Other suitable pervoskites may include $Pb_xZr_{1-x}TiO_3$ ("PZT") where x ranges from about 0.05 to about 0.4, lead lanthanum zirconium titanate ("PLZT"), lead titanate ($PbTiO_3$), barium calcium zirconium titanate ($BaCaZrTiO_3$), sodium nitrate ($NaNO_3$), $KNbO_3$, $LiNbO_3$, $LiTaO_3$, $PbNb_2O_6$, $PbTa_2O_6$, $KSr(NbO_3)$ and $NaBa_2(NbO_3)_5KHb_2PO_4$. Still additional complex perovskites may include $A[B1_{1/3}B2_{2/3}]O_3$ materials, where A is $Ba_xSr_{1-x}$ (x can be a value from 0 to 1); B1 is $Mg_yZn_{1-y}$ (y can be a value from 0 to 1); B2 is $Ta_zNb_{1-z}$ (z can be a value from 0 to 1). A potential dielectric material of interest may be formed by combining two end-member compositions in alternating layers, as shown in the exemplary embodiment of FIG. 14. Such end-member compositions may be chemically similar, but differ in the ratios of A-site dopants as discussed above. For example, composition 1 (132 in FIG. 14) may be a perovskite compound of the general formula $(A1_x, A2_{(1-x)})BO_3$ and composition 2 (134) may be a perovskite of the general formula $(A1_y, A2_{(1-y)})BO_3$, where A1 and A2 are from Ba, Sr, Mg, and Ca; the potential B-site members are Zr, Ti and Sn, and "x" and "y" denote the mole fraction of each component. A specific example for compound 1 may be $(Ba_{0.8}Sr_{0.2})TiO_3$ and compound 2 may be $(Ba_{0.6}Sr_{0.4})TiO_3$. These two compounds may be combined in alternating layers in a sintered multilayer capacitor with tunable electrode structures, as shown in FIG. 14, such that the dielectric properties of each material are superimposed. If desired, the pervoskite material may also be doped with rare earth oxides ("REO"), such as in an amount less than or equal to 5.0 mole percent, and more preferably from 0.1 to 1 mole percent. Suitable rare earth oxide dopants for this purpose may include, for instance, scandium, yttrium, lanthanum, cerium, praseodymium, neodymium, promethium, samarium, europium, gadolinium, terbium, dysprosium, holmium, erbium, thulium, ytterbium, and lutetium.

A tunable dielectric material can allow for the capacitance of the resulting capacitor to be tuned by applying a DC bias voltage through bias terminations. More particularly, the capacitor contains a set of first active electrodes that are in electrical contact with a first active termination (e.g., input termination) and a set of second active electrodes that are in electrical contact with a second active termination (e.g., output termination). The capacitor also contains a set of first DC bias electrodes that are in electrical contact with a first DC bias termination and a set of second DC bias electrodes that are in electrical contact with a second DC bias termination. When provided in a circuit, a DC power source (e.g., battery, constant voltage power supply, multiple output power supply, DC-DC converters, etc.) can provide a DC bias to the capacitor through the first and second bias terminations, which are typically bipolar in that they have an opposite polarity. The electrodes and terminations may be formed from any of a variety of different metals as is known in the art, such as precious metals (e.g., silver, gold, palladium, platinum, etc.), base metals (e.g., copper, tin, nickel, etc.), and so forth, as well as various combinations thereof. The dielectric layers are interposed between the respective active electrode and bias electrodes.

The voltage tunable capacitor may exhibit excellent tunability over a range of high capacitance values at medium to high operating voltages while also providing exceptionally low equivalent series resistance. In some embodiments, these capacitors may be assembled into an array, as described in greater detail in subsequent sections. In other embodiments, these capacitors may be used as individual components. The individual tunable multilayer capacitor may be used in applications where a high capacitance is required, such as at values of 0.1 microFarads ("μF") or more, in some embodiments about 1 μF or more, in some embodiments about 10 μF or more, and in some embodiments 200 μF or more. For instance, such a capacitor may provide tuning capability having initial capacitance values ranging from 0.1 to 100 μF, in some embodiments from about 0.5 μF to about 50 μF, in some embodiments from about 1 μF to about 40 μF, and in some embodiments from about 2 μF to about 30 μF. In alternative embodiments, the initial capacitance value of the tunable multilayer capacitor may be about 100 picoFarads ("μF") or more, in some embodiments about 10,000 μF or more, in some embodiments from about 100,000 μF to about 10,000,000 μF, in some embodiments from about 200,000 μF to 5,000,000 μF, and in some embodiments from about 400,000 μF to about 3,500,000 μF. The tunable multilayer capacitor may be configured to have any suitable initial capacitance value.

The degree to which the capacitance can be tuned may vary as desired. For example, the capacitance may be adjusted by from about 10% to about 100% of an initial capacitance of the capacitor, i.e., with no DC bias voltage applied, and in some embodiments from about 20% to about 95%, and in some embodiments, from about 30% to about 80% of the initial capacitance.

As indicated above, the individual tunable capacitor may exhibit low ESR. In some embodiments, the equivalent series resistance (ESR) of the individual tunable capacitor may range from about 50 milliohm (mΩ) or less, in some embodiments about 20 mΩ or less, in some embodiments about 10 mΩ or less. For example, in some embodiments, the ESR of the tunable capacitor may range from about 1 mΩ to about 50 mΩ, in some embodiments from about 5 mΩ to about 40 mΩ, and in some embodiments from about 5 mΩ to about 20 mΩ.

As indicated above, the individual tunable capacitor may operate at medium to high operating voltages. The operating voltage may refer to the DC bias voltage (i.e., the voltage across the bias electrodes) and/or the signal voltage, (i.e., the voltage across the active electrodes). The operating voltage may generally vary relative to the voltage at which the dielectric composition begins to become conductive upon application of an electric field, i.e., the "breakdown voltage", which can be determined in accordance with ASTM D149-13 at a temperature of 25° C. In most embodiments, the operating voltage is about 50% or less, in some embodiments, about 30% or less, and in some embodiments, from about 0.5% to about 10% of the breakdown voltage of the dielectric composition.

For example, the tunable capacitor may operate at AC voltages (e.g., peak-to-peak amplitude) greater than about 10 V, in some embodiments greater than about 50 V, and in some embodiments greater than about 100 V. For example, in some embodiments, the tunable capacitor may operate at voltages ranging from about 10 V to about 300 V, in some embodiments from about 15 V to about 150 V, and in some embodiments from about 20 V to about 100 V. In some embodiments, the tunable capacitor may operate at DC voltages greater than about 10 V, in some embodiments greater than about 50 V, and in some embodiments greater than about 100 V. For example, in some embodiments, the tunable capacitor may operate at voltages ranging from about 10 V to about 300 V, in some embodiments from about 15 V to about 150 V, and in some embodiments from about 20 V to about 100 V. In some embodiments, the tunable capacitor may operate at voltages having both an AC component and a DC component.

In some embodiments, the dielectric layers may have thicknesses ranging from about 0.5 micrometer (μm) to about 50 μm, in some embodiments from about 1 μm to about 40 μm, and in some embodiments from about 2 μm to about 15 μm. The electrode layers may have thicknesses ranging from about 0.5 μm to about 3.0 μm, in some embodiments from about 1 μm to about 2.5 um, and in some embodiments from about 1 μm to about 2 μm, e.g., about 1.5 μm.

The total number of active and bias electrode layers may vary. For example, in some embodiments, the total number of active electrode layers may range from 2 to about 1,000, in some embodiments from about 10 to about 700, and in some embodiments from about 100 to about 500. For example, in some embodiments, the total number of bias electrodes may range from 2 to about 1,000, and in some embodiments from about 10 to about 500. It should be understood that the numbers of electrode and bias layers depicted in the Figures and described herein are illustrative only.

In some embodiments, the capacitor may be compact such that it provides a high capacitance while occupying a small volume and/or surface area of a surface to which it mounted. Thus, the capacitor may be well suited for installation on a printed circuit board, for example. The length of the individual capacitor may, for instance, range from about 1 mm to about 50 mm, in some embodiments from about 2 mm to about 35 mm, in some embodiments from about 3 mm to about 10 mm, in some embodiments from about 3 mm to about 7 mm. The width of the individual capacitor may, for instance, range from about 1 mm to about 50 mm, in some embodiments from about 2 mm to about 35 mm, in some embodiments from about 3 mm to about 10 mm, in some embodiments from about 3 mm to about 7 mm.

Similarly, the capacitor may have a low profile suitable for installation on a printed circuit board, for example. The thickness of the individual capacitor may, for instance, range from about 1 mm to about 50 mm, in some embodiments from about 2 mm to about 35 mm, in some embodiments from about 3 mm to about 10 mm, in some embodiments from about 2 mm to about 4 mm.

Additionally, in some implementations, the systems and methods described herein may be used to tune a partially tunable multilayer capacitor. The partially multilayer capacitor may include at least one non-tunable region and at least one tunable region. The partially tunable multilayer capacitor may be tunable with improved resolution, or precision, compared to an equivalent fully tunable multilayer capacitor. In some embodiments, the partially tunable multilayer capacitor may provide a smaller change in capacitance per unit change in applied voltage, resulting in more precise tuning.

The partially tunable multilayer capacitor may be tunable across a smaller range of capacitance values than an equivalent fully tunable multilayer capacitor. For instance, a fully tunable capacitor may be tunable, for example, from about 10% to about 95% of an initial capacitance value. This may be accomplished by applying a DC bias voltage to the fully tunable capacitor that ranges from 0% to 100% of a maximum DC bias voltage. In contrast, a comparably sized partially tunable multilayer capacitor may only be tunable from about 50%, for example, to about 95% of an initial capacitance value across the same applied DC bias voltage range. Thus, the partially tunable multilayer capacitor may provide less change in capacitance per unit change in applied voltage. In some embodiments, the partially tunable multilayer capacitor may be tunable from about 20% to about 95% of an initial capacitance value, in some embodiments from about 30% to about 95%, in some embodiments from about 40% to about 95%, in some embodiments from about 50% to about 95%, in some embodiments from about 60% to about 95%, in some embodiments from about 70% to about 95%, and in some embodiments from about 80% to about 95% of the initial capacitance value.

In some implementations, the systems and method described herein may be used to tune a tunable multilayer capacitor array. The tunable multilayer capacitor array may include a plurality of voltage tunable capacitors and/or non-tunable capacitors. The capacitors may be connected in parallel to provide an increased capacitance. The capacitors may be connected in series to provide higher operating voltages.

I. Example Embodiments of the System and Controller

FIG. 1 illustrates an embodiment of a system 100 for tuning a voltage tunable capacitor 102 according to aspects of the present disclosure. The system 100 may include a controller 104 and the voltage tunable capacitor 102. The controller may be configured to receive at least one input signal. As an example, the controller 102 may be configured to receive a manual control signal 106, $V_{CONTROL}$. The manual control signal 106 may be indicative of a desired capacitance and/or a desired voltage associated with the voltage tunable capacitor 102. In some embodiments, the manual control signal may range from about 0 volts to at least about 3 volts. However, in some embodiments, the controller 104 may not be configured receive any manual control signal(s) 106.

In some embodiments, the controller 102 may be configured to receive a feedback signal 108 associated with the voltage tunable capacitor 102 (e.g., voltage, capacitance, current, temperature, etc.). Thus, the controller 102 may be configured for closed-loop operation. In other embodiments, however, the controller 102 may be configured for open-loop operation. In other words, the controller 102 may not receive a feedback signal associated with the voltage tunable capacitor 102.

The controller 104 may be configured to receive other input signals 109. Examples include signals indicative of a voltage, capacitance, current, or temperature associated a circuit that includes or is otherwise coupled or associated with the voltage tunable capacitor.

The controller 104 may be coupled with a voltage common collector 110, $V_{CC}$. The voltage common collector 110 may be configured to supply the controller 104 with power. The controller 104 may be configured to process the input signal(s), for example include one or more of $V_{CONTROL}$ 110, the feedback signal 108, and/or other input signals 109, for example as described below with reference to FIG. 2. The controller 104 may be configured to process the input signal(s) using logic to generate and provide a boosted output signal 112 to the voltage tunable capacitor 102 to adjust a bias voltage of the voltage tunable capacitor 102. Adjusting the bias voltage of the voltage tunable capacitor 102 may adjust the capacitance of the voltage tunable capacitor 102 or capacitor array, for example as described below with reference to FIGS. 4 through 19.

In some embodiments, the controller 104 or system 100 may be assembled in a monolithic device. For example, the controller 104 may be sealed in a molding material or packaging to form the monolithic device. The monolithic device may include external terminations for electrically connecting the controller 104 with the tunable capacitor 102, inputs, and/or other electrical components. The monolithic device may be configured for surface mounting to a printed circuit board.

Figure 2:
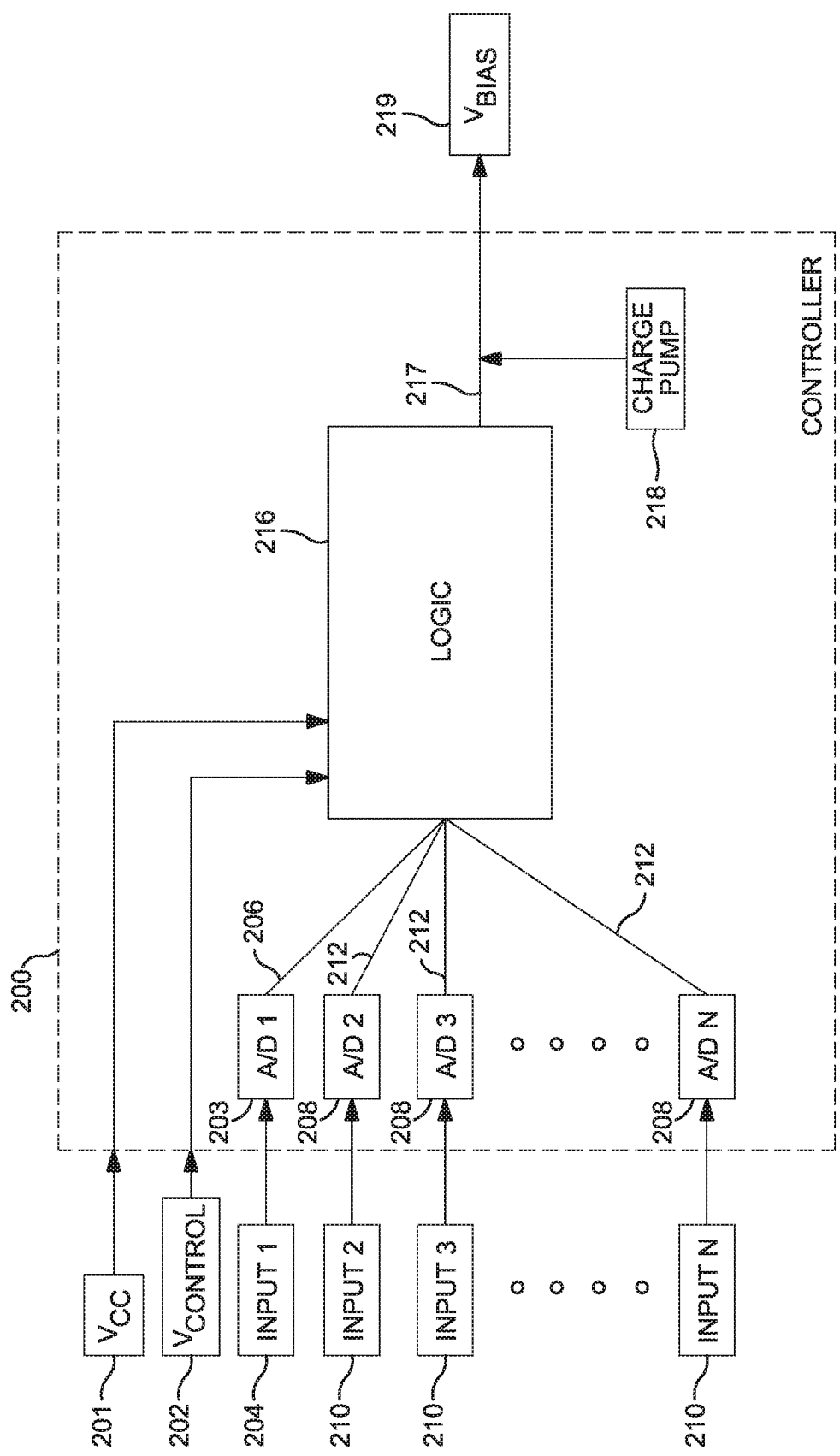
FIG. 2 illustrates an embodiment of a controller for tuning a voltage tunable capacitor according to aspects of the present disclosure.

FIG. 2 illustrates an embodiment of a controller 200 for tuning a voltage tunable capacitor according to aspects of the present disclosure. The controller 200 may correspond with the controller 104 of the system 100 described above with reference to FIG. 1. The controller 200 may be coupled with a voltage common collector 201, $V_{CC}$. The voltage common collector 201 may be configured to supply the controller 200 with power.

The controller 200 may be configured to receive one or more input signals. As an example, the controller 200 may receive a manual control signal 203, $V_{CONTROL}$, for example as described above with reference to FIG. 1. The manual control signal 214 may be indicative of at least one of a desired capacitance or a desired voltage associated with a voltage tunable capacitor. In some embodiments, the manual control signal may range from about 0 volts to at least about 3 volts.

The controller 200 may be configured to receive one or more input signals (e.g., in addition or alternative to the manual control signal 202). The controller 202 may include an analog-to-digital converter 203 configured to receive an input signal 204 and convert the input signal 204 into a digital signal 206. The controller 200 may include an analog-to-digital converter 203 (e.g., A/D 1) that is configured to receive a single input 204 (e.g., INPUT 1) and convert the input signal 204 into a digital signal 206. In some embodiments, the controller 200 may include additional analog-to-digital converters 208 (e.g., "A/D 2" through "A/D N"). The additional analog-to-digital converters 208 may be configured to receive additional input signals 210 (e.g., "INPUT 1" through "INPUT N"). The additional analog-to-digital converters 208 may be configured to convert the additional input signals 210 into respective digital signals 212.

The controller 200 may include a processor 216 configured to process the digital signal(s) 206, 212 using logic to generate an output signal 217. The processor 216 may be or include any suitable type of circuit (e.g., integrated circuit) capable of performing logic operations. For instance, in some embodiments the processor 216 may be or include an Advanced RISC Machines (ARM) processor memory device(s) (e.g., an "Armcore" processor). The processor 216 may be any suitable processing device include (e.g., a processor core, a microprocessor, an ASIC, a FPGA, a controller, a microcontroller, etc.) and can be one processor or a plurality of processors that are operatively connected. The processor 216 may include or be coupled with memory element(s) including one or more non-transitory computer-readable storage mediums, such as RAM, ROM, EEPROM, EPROM, flash memory devices, magnetic disks, etc., and combinations thereof. The memory can store data and instructions which are executed by the processor to cause the user computing device to perform various operations, such as one or more aspects of the method 300 described below with reference to FIG. 3. The processor 216 may be configured to employ any suitable type of logic, such as open-loop control or closed-loop control. Examples of open-loop control include proportional, proportional-integral (PI), or proportional-integral-derivative (PID) control loops. The processor 216 may implement Boolean logic, fuzzy logic, and/or machine-learning techniques or models.

The controller 200 may include a charge pump 218 configured to boost the output signal 217 to generate a boosted output signal 219. The charge pump 218 may be any suitable type of voltage raising device (e.g., DC-to-DC converter). For example, the charge pump 218 may employ rapid switching of alternating currents to produce the boosted output signal. In some embodiments, the charge pump 218 may be free of an inductor. The charge pump 218 may generally be unregulated such that the boosted output signal 219 is positively correlated with a DC voltage received by the charge pump (e.g., the output signal 217 of the processor 216). In other words, the charge pump 218 may be configured to boost the output signal 217 of the processor 216 by a linear gain or according to a non-decreasing function. For example, the charge pump 218 may be configured to boost the output signal 217 of the processor 216 by a factor or gain of 2 or greater (e.g., as a "doubling" charge pump).

The controller 200 may be configured to provide the boosted output signal 219, VBIAS, to a voltage tunable capacitor to adjust a bias voltage of the voltage tunable capacitor, for example as described with reference to FIG. 1.

The input signal(s) 204, 210 may include a variety of different inputs or parameters. As examples, the input signal(s) 204, 210 may be indicative of a voltage, a current, a capacitance, temperature and/or other suitable parameter associated with the voltage tunable capacitor, for example as described above with respect to the feedback signal 108 of FIG. 1.

As other examples, the input signal(s) 204, 210 may be indicative of a voltage, current, capacitance, temperature, and/or other suitable parameter associated with a circuit that includes or is otherwise connected or associated with the voltage tunable capacitor. The input signal(s) 204, 210 may be indicative of a temperature of a component (e.g., other than the voltage tunable capacitor) of a circuit associated with the voltage tunable capacitor. For instance, the input signal(s) 204, 210 may be indicative of a temperature of a heat sink or other temperature-critical component of the circuit. As another example, the input signal(s) 204, 210 may be indicative of a desired output voltage or current of the circuit.

The temperature of the voltage tunable capacitor or other component may be detected by a temperature sensor, such as a thermocouple. The controller 200 can be configured to receive signals indicative of the detected temperature from the temperature sensor.

The controller 200 may provide control over a capacitance of the voltage tunable capacitor, which may have relatively high operating voltages, based on one or more input signals having relatively low voltages. For example, the controller 200 may be configured to adjust the bias voltage of the voltage tunable capacitor from about 0 volts to at least about 50 volts. The input signal(s) may range from about 0 volts to at least about 5 volts. Thus, a ratio of the bias voltage of the voltage tunable capacitor to the voltage of the input signal may range from about 1 to about 10, or greater. Similarly, the manual control signal may range from about 0 volts to at least about 3 volts. Thus, a ratio of the bias voltage of the voltage tunable capacitor to the manual control signal may range from about 1 to about 16, or greater.

Figure 3:
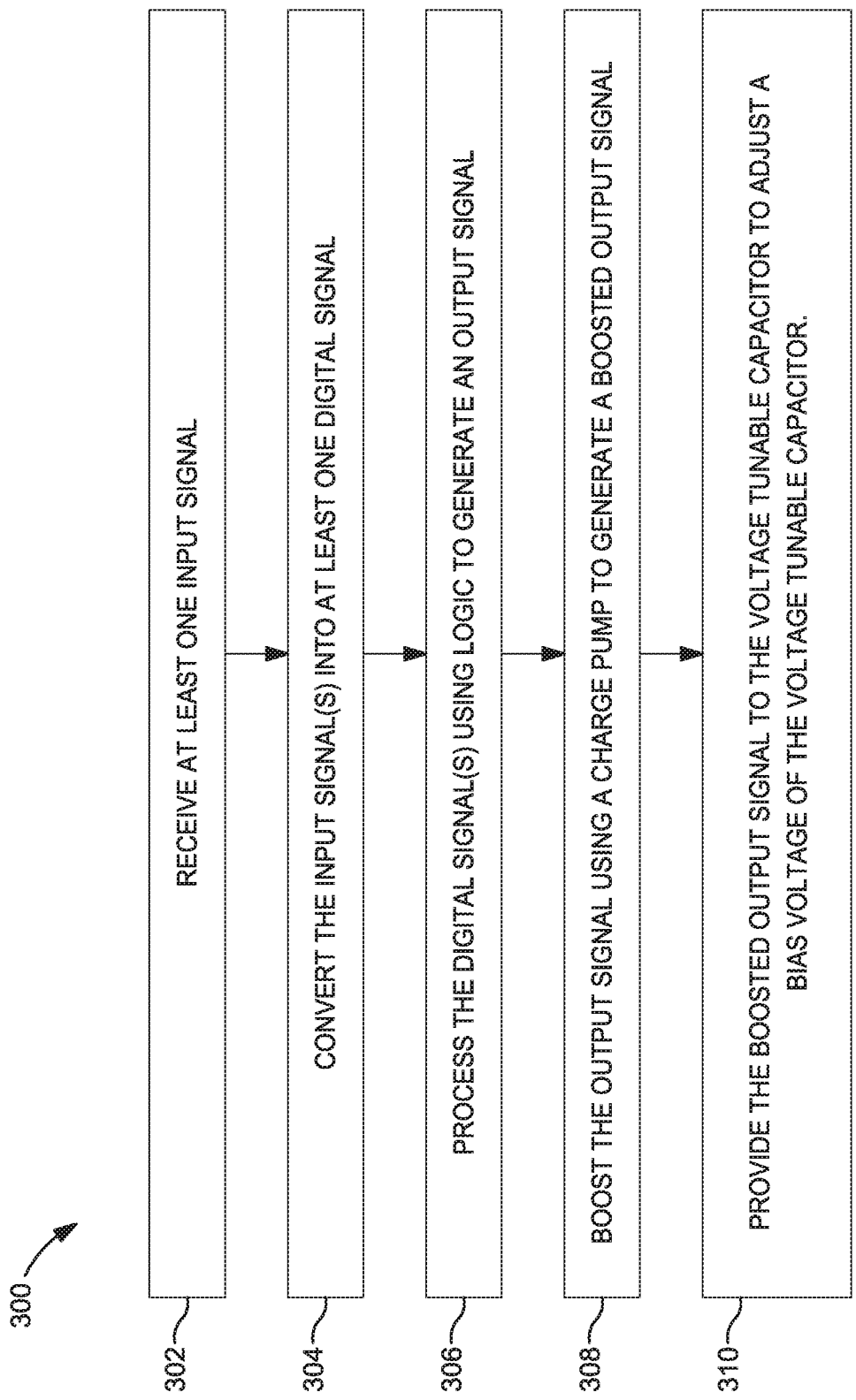
FIG. 3 illustrates a flowchart of a method for tuning a voltage tunable capacitor according to aspects of the present disclosure.

FIG. 3 illustrates a flowchart of a method 300 for tuning a voltage tunable capacitor according to aspects of the present disclosure. FIG. 3 depicts a steps performed in a particular order for purposes of illustration and discussion. Those of ordinary skill in the art, using the disclosures provided herein, will understand that various steps of any of the methods described herein can be omitted, expanded, performed simultaneously, rearranged, and/or modified in various ways without deviating from the scope of the present disclosure. In addition, various steps (not illustrated) can be performed without deviating from the scope of the present disclosure. Additionally, the method 300 is generally discussed with reference to the system 100 and controller 200 described above with reference to FIGS. 1 and 2. However, it should be understood that aspects of the present method 300 may find application with any suitable control system and/or controller for tuning a voltage tunable capacitor.

The method 300 may include, at (302), receiving at least one input signal, for example as described above with reference to the manual control signal 106, 202 and/or other input signals 109, 204, 210 described above with reference to FIGS. 1 and 2.

The method 300 may include, at (304), converting the input signal(s) into at least one digital signal. The input signal(s) may be converted into digital signal(s) using one or more analog-to-digital converters 206, 212, for example as described above with reference to FIG. 2.

The method 300 may include, at (306), processing the digital signal(s) using logic to generate an output signal, for example as described above with reference to the output signals 112, 217 of FIGS. 1 and 2.

The method 300 may include, at (308), boosting the output signal(s) using a charge pump to generate a boosted output signal, for example as described above with reference to the charge pump 218 of FIG. 2.

The method 300 may include, at (310), providing the boosted output signal to the voltage tunable capacitor to adjust a bias voltage of the voltage tunable capacitor, for example as described above with reference to FIGS. 1 and 2.

II. Example Embodiments of the Tunable Multilayer Capacitor

Figure 4:
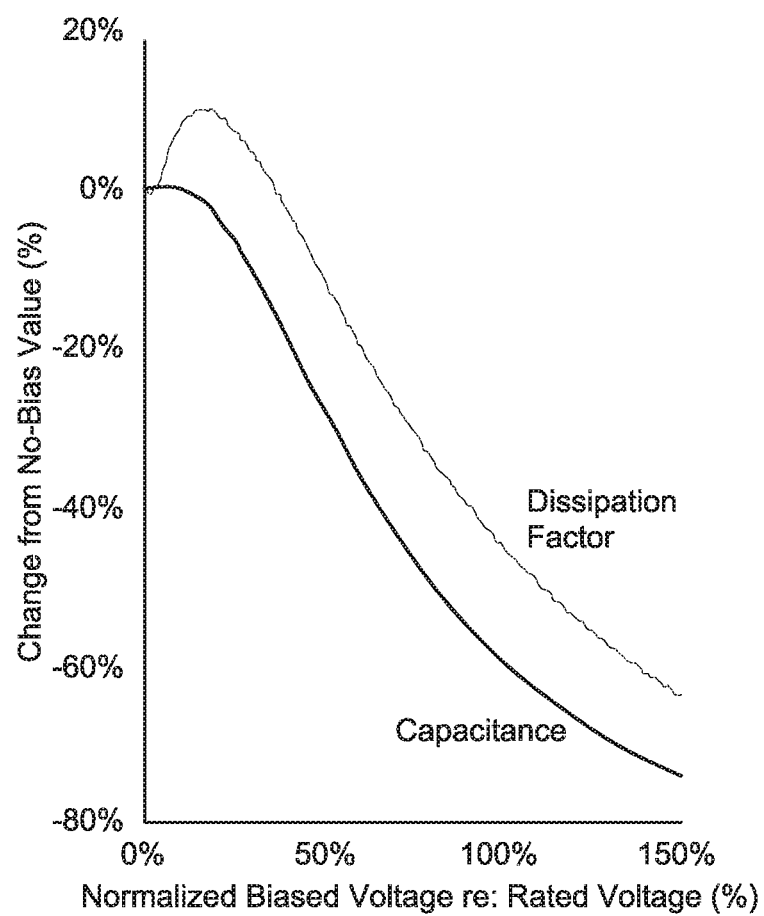
FIG. 4 graphically illustrates the change in capacitance of a voltage tunable capacitor that can be tuned with the controller and/or system disclosed herein over a range of normalized biasing voltage changes according to aspects of the present disclosure.
Figure 5A:
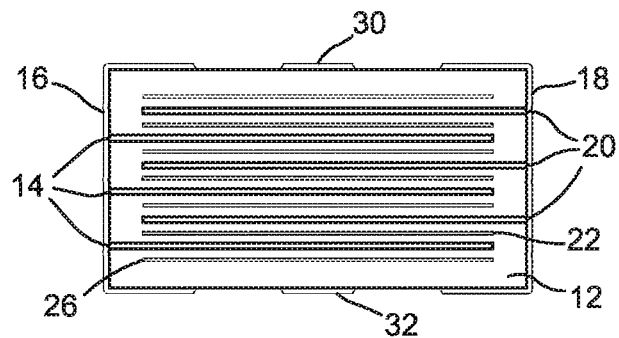
FIGS. 5A, 5B, and 5C illustrate, respectively, a sectional view, an exploded plan view, and an exploded perspective view, of an exemplary embodiment of a four-termination biased multilayer capacitor that can be tuned with the controller and/or system disclosed herein in accordance with presently disclosed subject matter.
Figure 5B:
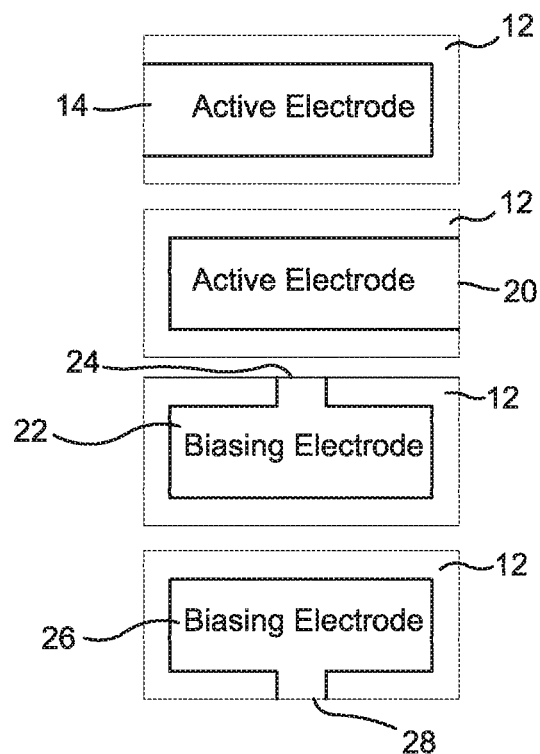
Figure 5C:
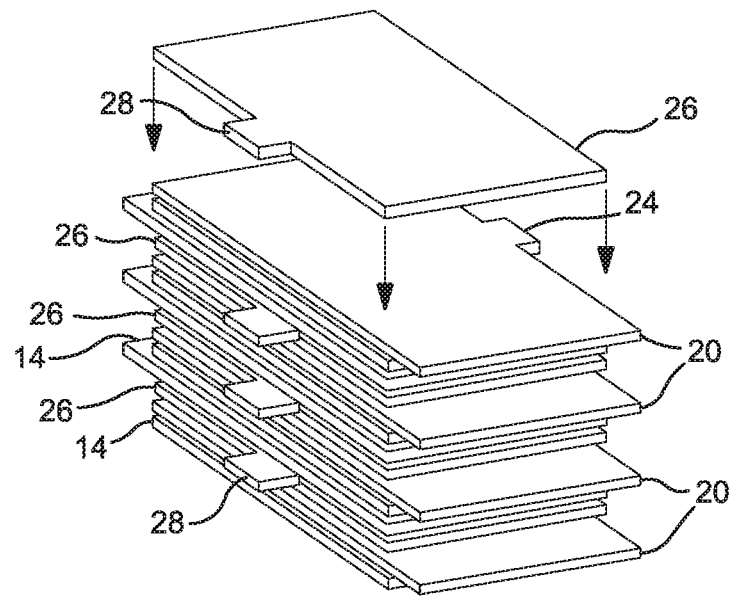
Figure 5D:
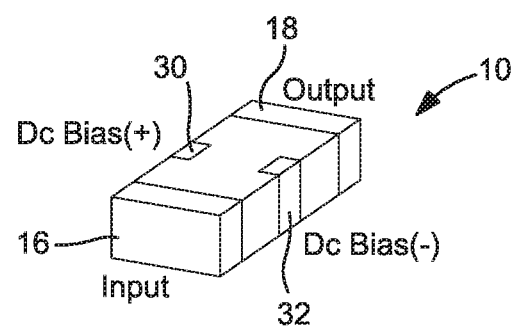
FIG. 5D illustrates a perspective view of an assembled device that can be tuned with the controller and/or system disclosed herein in accordance with the exemplary embodiment of present FIGS. 5A through 5C.

FIG. 4 illustrates in graphic form the change in capacitance that can be achieved over a range of normalized biasing voltage changes. Specifically, the horizontal axis graphs a normalized biased voltage as a percentage of the rated voltage of a device, such as from 0% to 150%. As shown, a corresponding change in device effective capacitance is graphed on the vertical axis, as a percentage of change from the capacitance value without any bias. As shown by the graph of such FIG. 1, an increase of 150% in the normalized bias voltage amount approaches towards an 80% decrease in the no-bias capacitance value, along a relatively straight-line curve, as illustrated. In such way, a voltage tunable capacitor device in accordance with the presently disclosed subject matter helps to maximize efficiency over a range of use conditions.

Referring now to FIGS. 5A through 5D, one particular embodiment of a capacitor 10 that can be formed in accordance with the present disclosure will now be described in further detail. As shown, the capacitor 10 contains a plurality of dielectric layers 12 that are stacked alternately relative to two separate sets of active electrodes 14 and 20 and two separate sets of bias electrodes 22 and 26. The capacitor may be a six-sided body, such as a rectangular-shaped body. In the illustrated embodiment, a first active termination 16 is electrically connected to the first active electrodes 14 and a second active termination 18 is electrically connected to the second active electrodes 20. The first bias electrodes 22 are electrically connected with a first DC bias (+) termination 30 via extending members 24 (e.g., tabs) that extend to the side of the capacitor 10. Similarly, the second bias electrodes 26 are electrically connected with a second DC bias (−) termination 32 via extending members 28. Accordingly, the resulting capacitor 10 contains four (4) separate terminations. In some embodiments, the active terminations 16, 18 may wrap around the respective ends of the capacitor 10 to provide larger terminations 16, 18 for electrically connecting the capacitor 10 in a circuit. The DC bias terminations 30, 32 may be configured as strips that do not extend the entire sides of the capacitor 10. In other embodiments, however, the DC bias terminations 30, 32 may instead wrap around the sides of the capacitor 10, and the active terminations 16, 18 may be configured as strips that do not extend the along the entire ends of the capacitor.

Figure 6A:
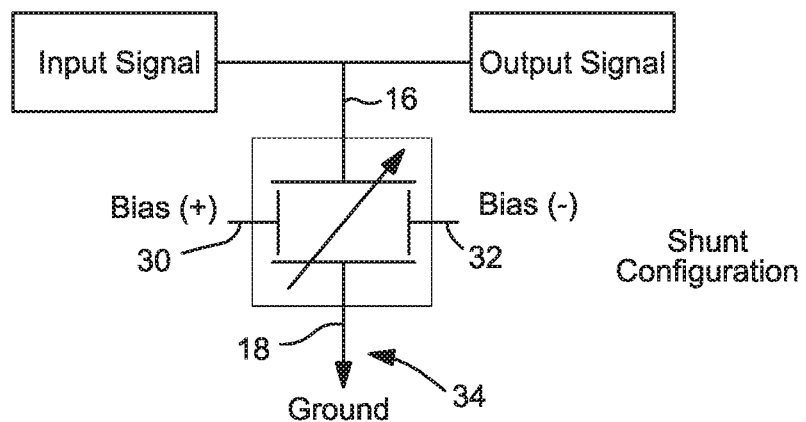
FIGS. 6A and 6B illustrate, respectively, shunt configuration and series configuration representative diagrams of circuits including the device of FIGS. 5A through 5D.
Figure 6B:
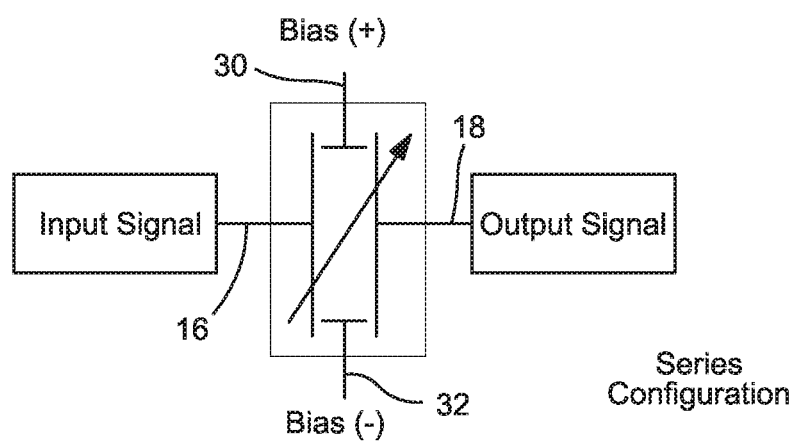

FIGS. 6A and 6B illustrate, respectively, shunt configuration and series configuration representative diagrams of the exemplary embodiment of present FIGS. 5A through 5D. As shown, a ground 34 is also provided relative to the biasing inputs is shown for the shunt configuration.

Figure 7A:
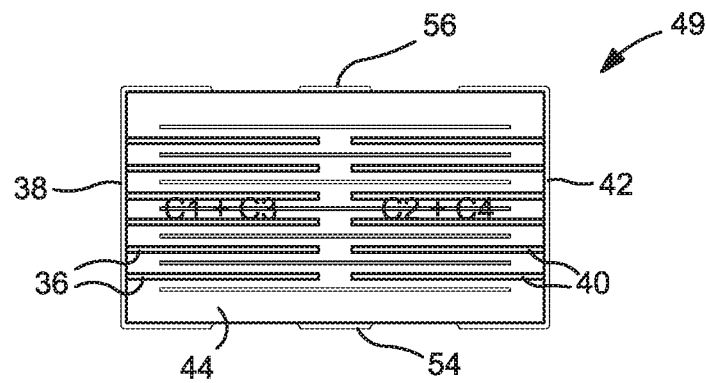
FIGS. 7A, 7B, and 7C illustrate, respectively, a sectional view, an exploded plan view, and an exploded perspective view of a four-termination tunable cascade configuration multilayer capacitor that can be tuned with the controller and/or system disclosed herein in accordance with aspects of the present disclosure.
Figure 7B:
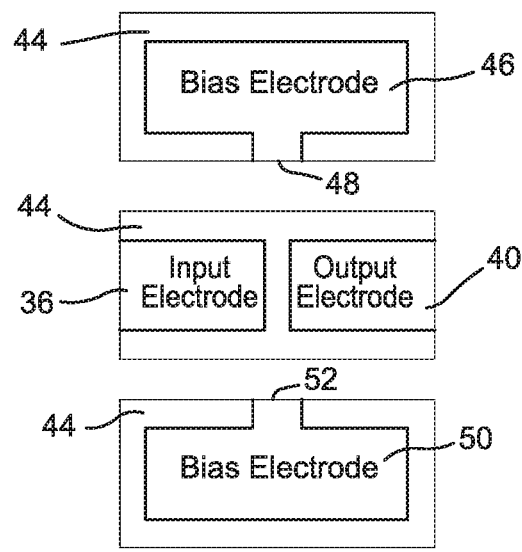
Figure 7C:
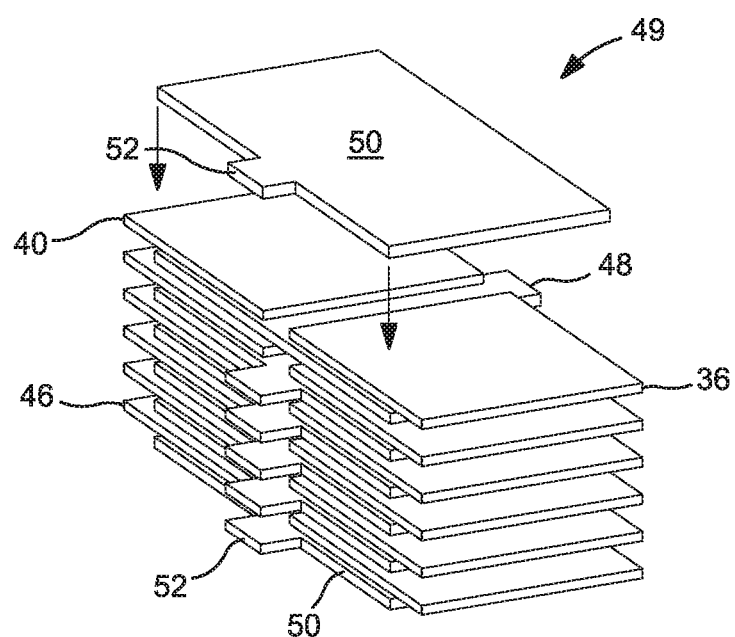
Figure 7D:
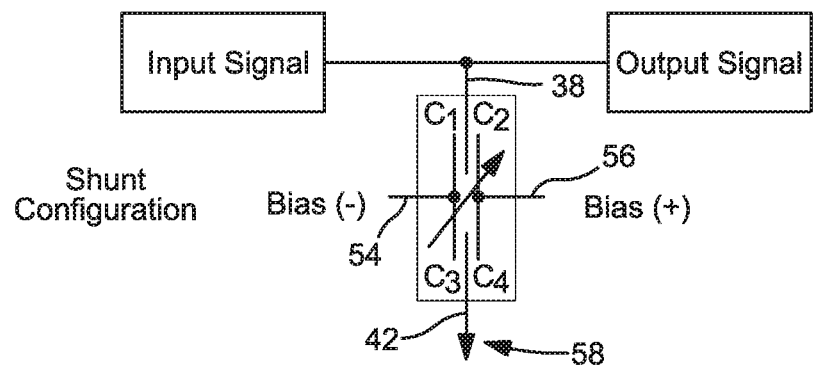
FIGS. 7D and 7E illustrate, respectively, shunt configuration and series configuration representative diagrams of circuits including the exemplary embodiment of present FIGS. 7A through 7C.
Figure 7E:
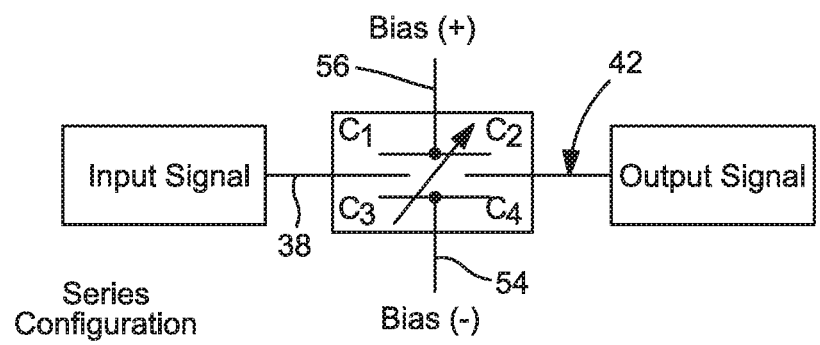

In the embodiment discussed above, the active electrodes are stacked so that each alternate electrode connects to opposite terminations. In certain embodiments, the alternating layers may be connected to the same terminations through the use of a "cascade" configuration in which each set of active electrodes is spaced apart laterally rather than in a stacked manner. One embodiment of such a cascaded capacitor 49 is shown in FIGS. 7A through 7C. As depicted, the capacitor 49 contains a plurality of dielectric layers 44 that are arranged relative to two separate sets of active electrodes 36 and 40 and two separate sets of bias electrodes 46 and 50. In the illustrated embodiment, this instance, a first active termination 38 is electrically connected with the first active electrodes 36 and a second active termination 42 is electrically connected to the second active electrodes 40. The first bias electrodes 46 are electrically connected with a first DC bias (−) termination 54 via extending members 48 that extend to the side of the capacitor 49. Similarly, the second bias electrodes 50 are electrically connected with a second DC bias (+) termination 56 via extending members 52. FIGS. 7D and 7E illustrate, respectively, shunt configuration and series configuration representative diagrams of the exemplary embodiment of present FIGS. 7A through 7C. As shown, a ground 58 is also provided relative to the biasing inputs is shown for the shunt configuration.

Figure 8A:
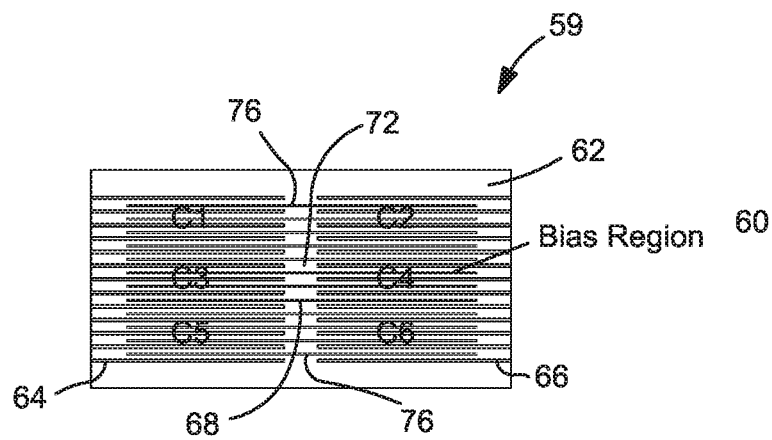
FIGS. 8A and 8B illustrate, respectively, a sectional view and an exploded plan view of an exemplary embodiment of a four-termination tunable partially biased configuration multilayer capacitor that can be tuned with the controller and/or system disclosed herein in accordance with aspects of the presently disclosed subject matter.
Figure 8B:
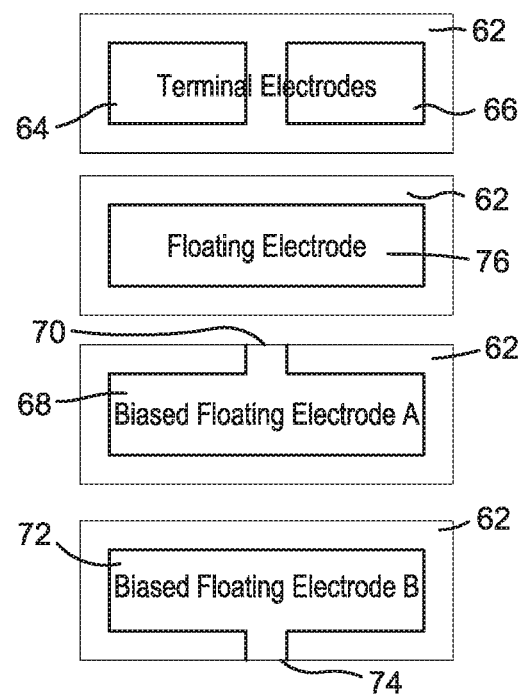
Figure 8C:
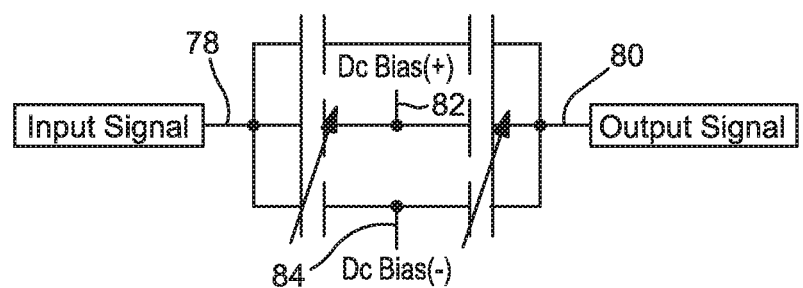
FIG. 8C illustrates a representative diagram a circuit including the device of FIGS. 8A and 8B.

FIGS. 8A through 8C illustrate another embodiment of a capacitor 59 that may be formed in a partially cascaded configuration in accordance with the present disclosure. The capacitor 59 is considered "partially cascaded" because only a partial region 60 of the total active capacitance region is biased (see FIG. 8A). The addition of biased floating electrodes as illustrated allows application of external voltage to change the dielectric properties of a total capacitance to be determined by other factors and features. As shown by such FIGS., dielectric layers 62 may be stacked alternately relative to first and second sets of active electrodes 64 and 66, first and second sets of bias electrodes 68 and 72, and a plurality of floating electrodes 76. The first active electrodes 64 are electrically connected with a first active termination 78 while the second active electrodes 66 are electrically connected with a second active termination 80. The first bias electrodes 68 are electrically connected with a first DC bias (+) termination 82 via extending members 70 that extend to the side of the capacitor 59. Similarly, the second bias electrodes 72 are electrically connected with a second DC bias (−) termination 84 via extending members 74. It should be understood that the number of electrode layers illustrated in FIG. 8A is illustrative only.

Figure 11B:
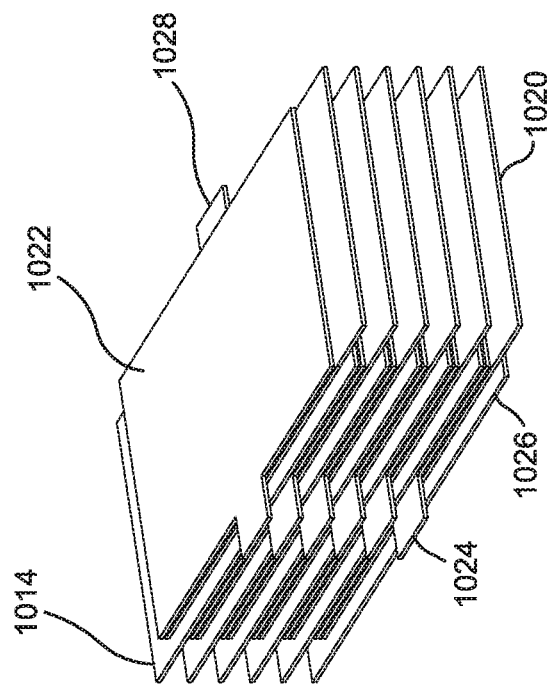
FIGS. 11A and 11B, illustrate, respectively, a sectional view and a partially expanded perspective view, of an exemplary embodiment of a 1:1 ratio overlapped symmetric design of a biased multilayer capacitor in accordance with presently disclosed subject matter.
Figure 11A:
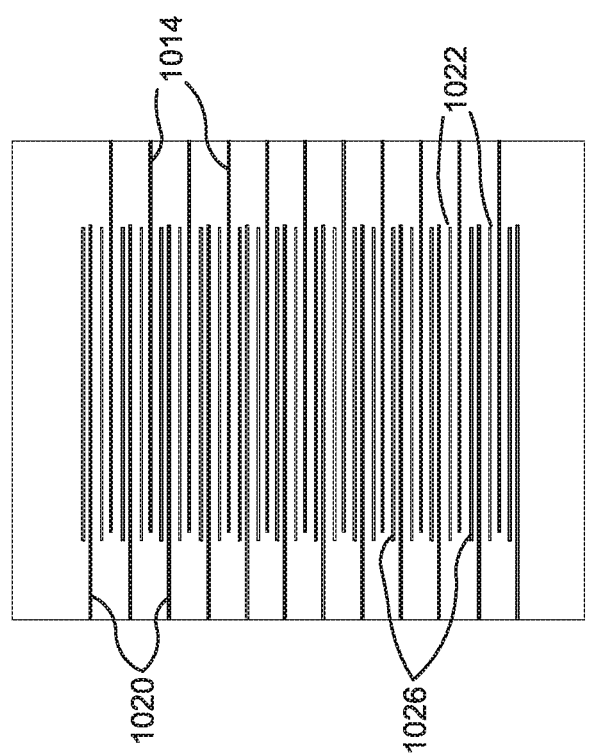

Yet another embodiment of a capacitor which can be tuned with the controller and/or system described herein is shown in FIGS. 11A and 11B. In this embodiment, first and second sets of active electrodes 1014, 1020, respectively, are stacked in an alternating 1:1 ratio pattern with first and second sets of bias electrodes 1022, 1026, respectively. Referring to FIG. 11B, in some embodiments, the leads 1024, 1028 of the bias electrodes 1022, 1026, may be configured as protruding tabs. The leads 1024, 1028 may contact the DC bias terminations 30, 32 in the finished form as illustrated in FIG. 2D. It should be understood that the number of electrode layers illustrated in FIGS. 11A and 11B are illustrative only.

Figure 11D:
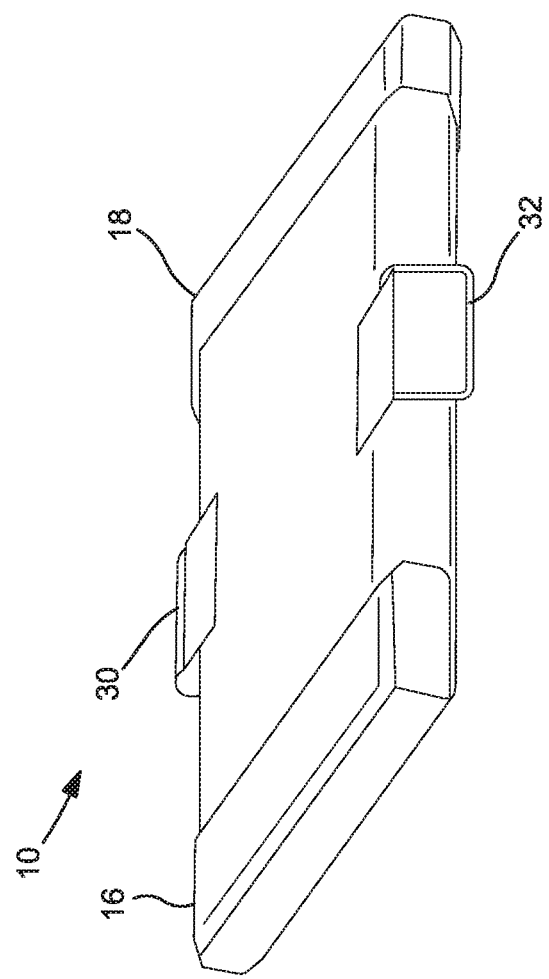
FIGS. 11C and 11D, illustrate, respectively, an exploded internal perspective view and a perspective view of another exemplary embodiment of a 1:1 ratio overlapped symmetric design of a biased multilayer capacitor in accordance with presently disclosed subject matter.
Figure 11C:
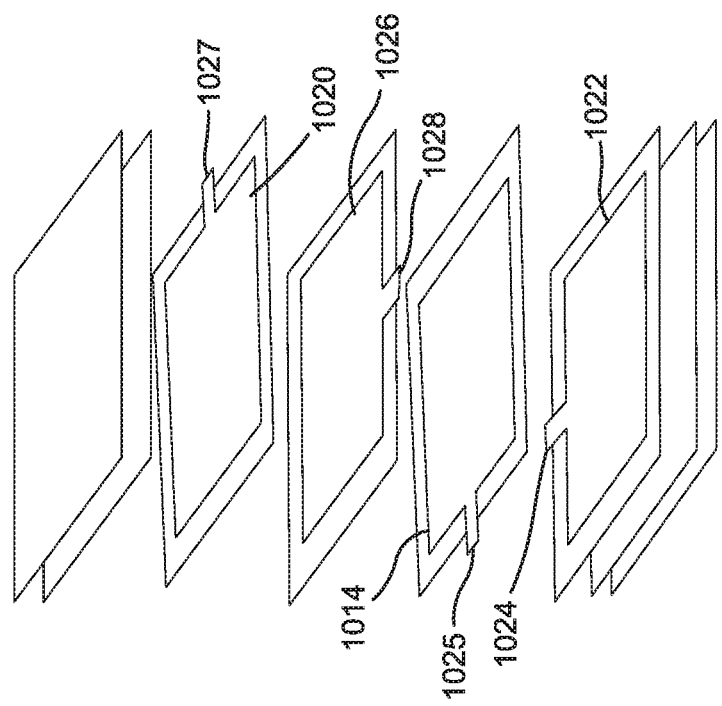

Another embodiment of a capacitor which can be tuned with the controller and/or system described herein is illustrated in FIGS. 11C and 11D. In this embodiment, the active electrodes 1014, 1020 may include respective leads 1025 and 1027 which may be configured as protruding tabs. The leads 1025, 1027 may be electrically connected with the respective active terminations 16, 18, which are illustrated in FIG. 11D. This may provide improved lamination between the edges of the layers of the capacitor, specifically at the corners of the layers, which may result in a more robust capacitor. Additionally, this configuration may reduce the occurrence of delamination issues during manufacturing.

Additionally, the respective widths of the tabs 1024, 1025, 1026, 1027 may be selected to advantageously provide greater electrical contact (e.g., having less resistance) to the respective electrodes 1014, 1020, 1022, 1026. Additionally, the widths of the tabs 1024, 1028 and widths of the terminations 30, 32 that are associated with the DC bias electrodes 1022, 1026 may be selected to avoid contact between the bias electrode terminations 30, 32 and the signal electrode terminations 16, 18. For example, in some embodiments, the tabs 1024, 1025, 1026, 1027 may extend along 10% or more of the edge of the capacitor, in some embodiments 30% or more, and in some embodiments 60% or more. It should be understood that the number of electrode layers illustrated in FIGS. 11A through 11D is illustrative only.

Figure 10:
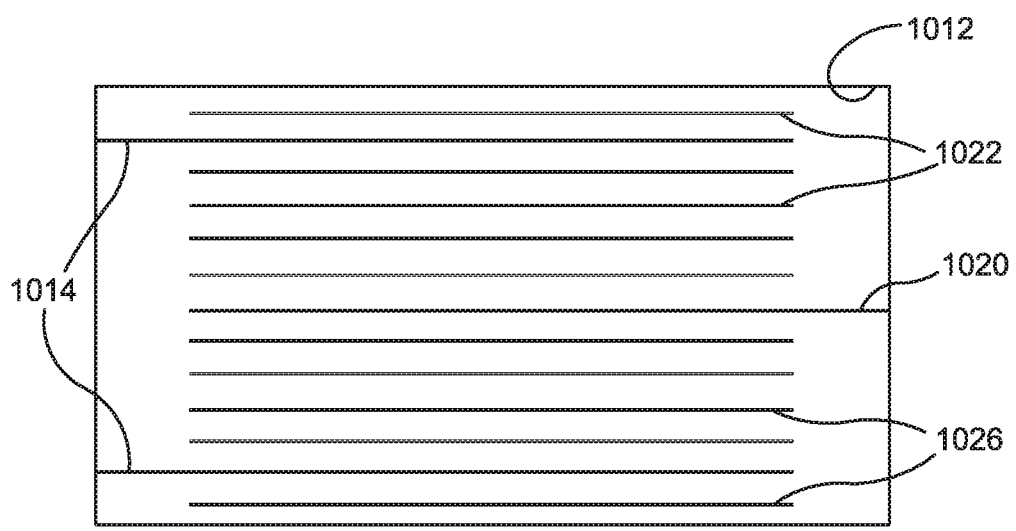
FIG. 10 illustrates a sectional view of an exemplary embodiment of a biased asymmetrical multilayer capacitor in accordance with presently disclosed subject matter.

In the embodiments discussed above, the electrodes are generally employed in a "symmetric" configuration in that the distance (or dielectric thickness) between the first active electrode and the second active electrode is generally the same as the distance between the first bias electrode and the second bias electrode. In certain embodiments, however, it may be desired to vary this thickness to achieve an "asymmetric" configuration. For example, the distance between the first and second active electrodes may be less than the distance between the first and second bias electrodes. In yet other embodiments, the distance between the first and second active electrodes may be greater than the distance between the first and second bias electrodes. Among other things, this may increase the DC field applied for a given level of applied DC bias, which will increase the level of tunability for a given DC bias voltage. Such an arrangement may also allow relatively larger tunability for relatively more modest DC voltages and the use of materials with modest tunability (with potentially lower losses and temperature/frequency variability). While such an asymmetric configuration can be accomplished in a variety of ways, it is typically desired to use additional "floating" bias electrodes between each pair of active electrodes. Referring to FIG. 10, for instance, one embodiment of such an asymmetric capacitor is shown that contains first and second active electrodes 1014 and 1020, respectively, in conjunction with first and second bias electrodes 1022 and 1026, respectively.

FIG. 12A illustrates another embodiment of an asymmetric capacitor in which every 11$^{th}$ electrode is an active electrode instead of a bias electrode (11:1 ratio design). In this case, each such respective active electrode (e.g., AC electrode) may be bounded by a pair of DC bias electrode having opposing polarities. Thus, a biasing field may be generated across each AC electrode. Such a configuration may provide capacitive coupling between the AC signal and both polarities of DC bias voltage, and vice versa. Each AC electrode 214, 220 may be disposed between a pair of bias electrodes having opposing polarities 222, 226. A first set of bias electrodes 222 may all have the same polarity, and a second set of bias electrodes 226 (illustrated with dashed lines) may all have opposite respective polarities to the first set of bias electrodes 222. This configuration may provide capacitive coupling between each AC electrode 214, 220 and both DC bias polarities.

Figure 9:
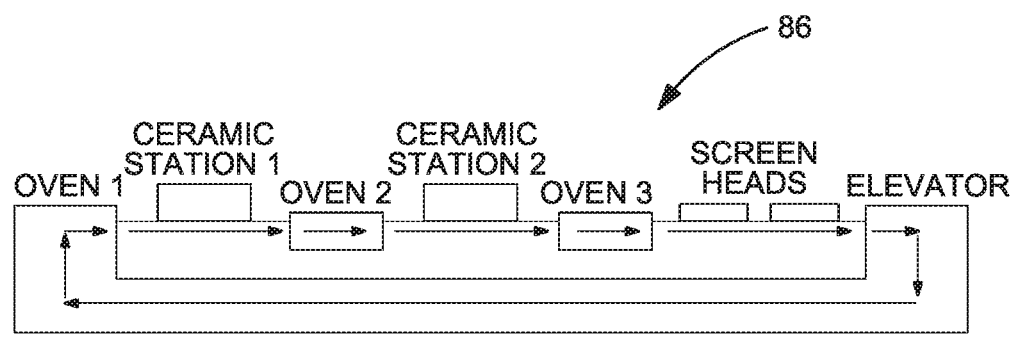
FIG. 9 represents a chip manufacturing automated process (CMAP) exemplary embodiment in accordance with presently disclosed subject matter, usable in manufacturing device exemplary embodiments as disclosed herewith.

FIG. 12B illustrates a sectional view of an exemplary embodiment of an 11:1 ratio "shielded" asymmetric design of a biased multilayer capacitor in accordance with presently disclosed subject matter. This is similar to the example shown in FIG. 8 except that each AC electrode 314, 320 is bounded by a pair of DC electrodes (322 or 326) having the same polarity. One set of bias electrodes 322 may all have the same polarity, and the other set of bias electrodes 326 (illustrated with dashed lines) may all have the opposite polarity. While the material between the two DC electrodes (322 or 326) having the same polarity may not provide tuning, the material may potentially provide shielding to the AC signal, reducing associated noise. Such a configuration may also provide coupling between each of the first set of AC electrodes 314 with a single DC bias polarity only. Similarly such a configuration may provide capacitive coupling between the second set of AC electrodes 320 and the opposite DC bias polarity only. It should be understood that the numbers of electrode layers illustrated in FIGS. 8 and 9 are illustrative only.

FIG. 13A illustrates a sectional view of an exemplary embodiment of a partially tunable multilayer capacitor 400 in accordance with aspects of the presently disclosed subject matter. The partially tunable multilayer capacitor 400 may include a first set of AC electrodes 402 electrically connected with a first active termination 404 and a second set of AC electrodes 406 electrically connected with a second active termination 408. The partially tunable multilayer capacitor 400 may also include DC bias electrodes 410 configured to apply a DC bias voltage across one or more variable dielectric regions 412 such that the dielectric constant of the variable dielectric regions 412 is altered as discussed in greater detail above. The partially tunable multilayer capacitor 400 may also include a non-tunable region 414 that is not tunable with the application of a DC bias voltage. For example, in some embodiments, the non-tunable region 414 may not contain any DC bias electrodes 410. Alternatively, in other embodiments, the non-tunable region 414 may contain electrodes that are not connected with any terminations such that no DC bias voltage may be applied within the non-tunable region 414. Thus, in some embodiments, the capacitance of the dielectric material in the non-tunable section 402 may not be affected by a DC bias voltage being applied across the DC bias electrodes 410.

FIG. 13B illustrates a schematic view of the partially tunable multilayer capacitor illustrated in FIG. 13A. In this embodiment, the non-tunable region 414 is connected in parallel with one or more variable dielectric regions 412. Applying a DC bias voltage across the DC bias terminations may alter the capacitance of the tunable region(s) 412, but not alter the capacitance of the non-tunable region 414. This may result in the partially tunable multilayer capacitor being tunable across a smaller range of capacitance values than an equivalent fully tunable multilayer capacitor. As a result, the change in capacitance per unit change in applied DC bias voltage may be less than an equivalent fully tunable multilayer capacitor. Thus, the partially tunable multilayer capacitor may provide greater tuning resolution, or precision.

Figure 15C:
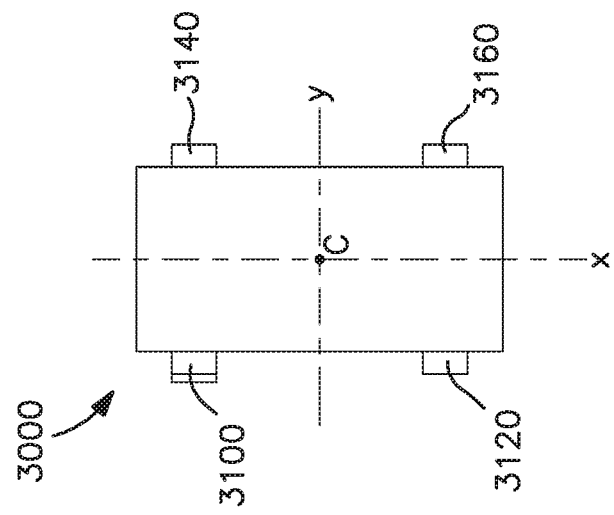
FIGS. 15A, 15B, and 15C illustrate, respectively, various symmetric orientations that may be employed for the active and bias terminations in certain embodiments of the present invention.
Figure 15B:
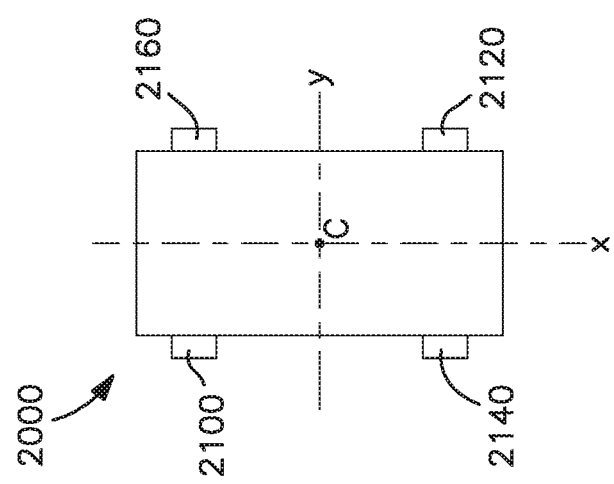
Figure 15A:
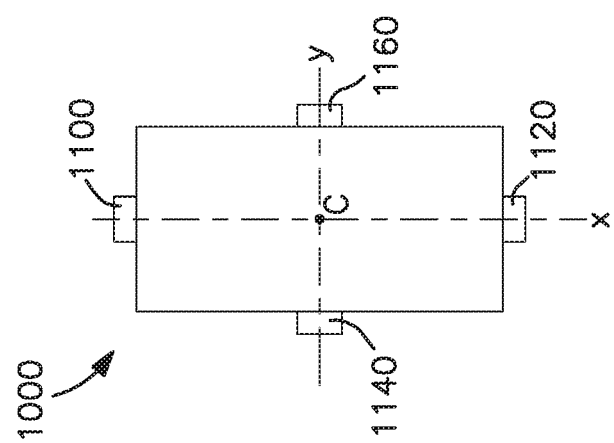

In some embodiments, the active and DC bias terminations are disposed symmetrically about an axis of the capacitor. For example, in one embodiment, the capacitor may contain opposing first and second end regions that are spaced apart in a longitudinal direction and opposing first and side regions that are spaced apart in a lateral direction. In certain embodiments, the active terminations may be located at respective end regions of the capacitor while the DC bias terminations may be located at respective side regions of the capacitor. When symmetrically arranged, the active terminations and/or DC bias terminations may be spaced equidistant from a longitudinal and/or lateral axis extending through the geometric center of the capacitor. Referring to FIG. 15A, for example, one embodiment of a capacitor 1000 is shown that contains a longitudinal axis "x" and a lateral axis "y" that are perpendicular to each other and extend through a geometrical center "C." In this particular embodiment, the capacitor 1000 contains first and second active terminations 1100 and 1120, respectively, which are located at end regions of the capacitor 1000 and centered about both the axes "x" and "y." Similarly, the capacitor 1000 contains first and second bias terminations 1140 and 1160 that are located at side regions of the capacitor 1000 and also centered about both the axes "x" and "y."

In certain embodiments, it may also be desired to locate two or more terminations on the same side of the capacitor. In FIG. 15B, for instance, one embodiment of a capacitor 2000 is shown that contains a first active termination 2100 and second active termination 2140 that are located on the same side region. The capacitor 2000 also contains a first bias termination 2160 and a second bias termination 2120 that are both located on another side region opposite to that of the active terminations. Despite being located only on the side regions, the active terminations 2100 and 2140 can still be symmetrically arranged in that they are both positioned equidistant from the axes "x" and "y." Similarly, the bias terminations 2160 and 2120 that are also located equidistant from the axes "x" and "y." In the above-referenced embodiments, the first active termination and first bias termination are positioned opposite to the respective second active termination and second bias termination. Of course, this is by no means required. In FIG. 15C, for instance, a capacitor 3000 is shown that contains first and second active electrode terminations 3100 and 3160, respectively, which are located at opposite side regions in an offset configuration. Nevertheless, the first active termination 3100 and second active termination 3160 are still symmetrically arranged in that they are both positioned equidistant from the axes "x" and "y." Similarly, the capacitor 3000 also contains first and second bias terminations 3120 and 3140 that are located at opposite side regions in an offset configuration yet equidistant from the axes "x" and "y." In other embodiments, the terminations e.g., bias terminations and/or active electrode terminations, may be asymmetrically configured about the "x" and "y" axes described above.

The presently disclosed subject matter equally encompasses associated and/or corresponding methodologies for improved voltage tunable devices, including for example, production of such devices, as well as their use in combination with associated circuitry. As further example, FIG. 9 represents a chip manufacturing automated process (CMAP) 86, which is usable in conjunction with manufacturing device exemplary embodiments as disclosed herewith. As shown, the process 86 may include a number of successive stages, involving in some instances three ovens with interceding ceramic stations or other steps/facets such as the use of screen heads or elevator and conveyor features, as representatively shown. Those of ordinary skill in the art will understand that the exact provision of successive steps will depend on which of the exemplary device embodiments disclosed herewith (or modifications thereof) are being produced. Also, the individual steps indicated are only intended as representative of the indicated type of step, and do not denote required use of other aspects beyond the general nature of the steps indicated. For example, the screen head step may involve the use of a stainless steel screen together with an electrode paste for screen pasting of electrode layers, or other technologies for such step may be practiced. For example, more conventional steps of alternate stacking and laminating (with tapes) may be practiced. In either process (or others), those of ordinary skill in the art will recognize that selected steps may be practiced to produce a particular design selected for a given application of the presently disclosed subject matter.

Figure 16A:
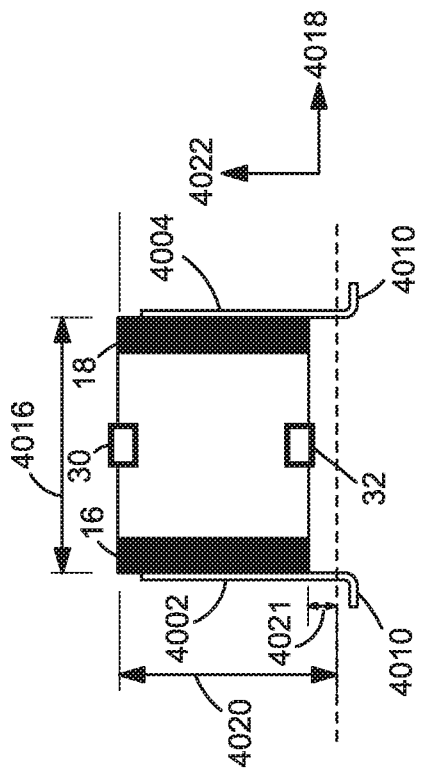
FIGS. 16A through 16C illustrate, respectively, a side view, a front view, and a perspective view of an embodiment of a tunable multilayer capacitor array in accordance with aspects of the presently disclosed subject matter.
Figure 16B:
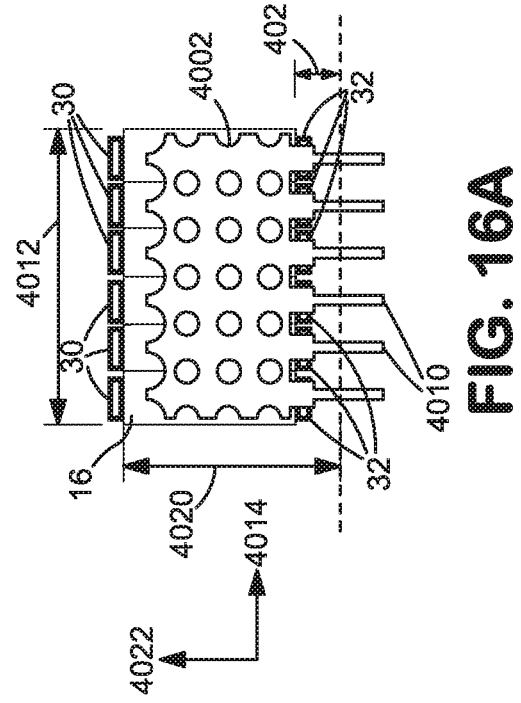
Figure 16C:
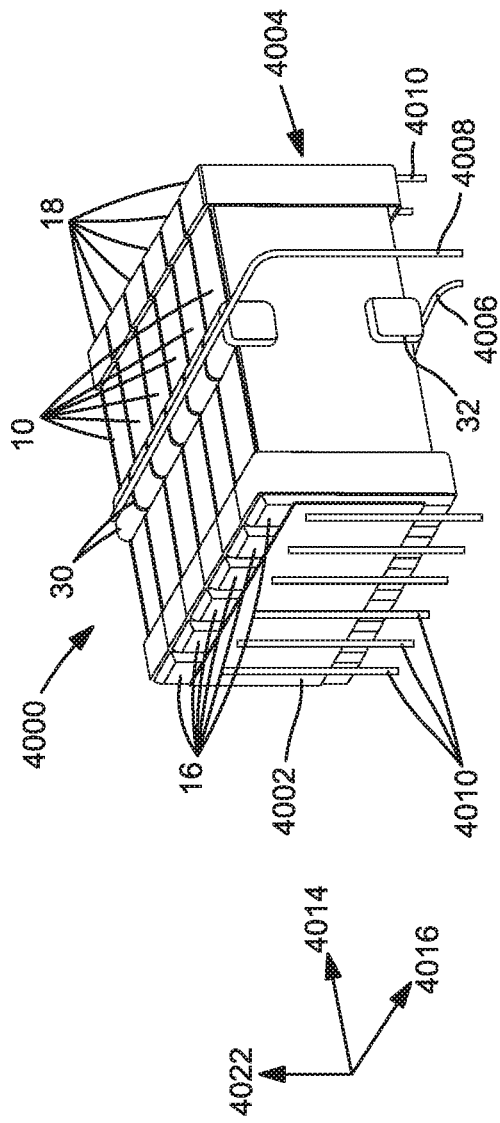

Referring to FIGS. 16A through 16C, a tunable multilayer capacitor array 4000 may be formed by arranging individual capacitors 10 in a "horizontal stack" configuration. The individual capacitors may be configured as described with reference to FIGS. 2 and 7, for example. The stacked capacitor array 4000 may provide increased capacitance and reduced ESR compared to a single capacitor 10. Additionally the stacked capacitor array 400 may allow for easier manufacturing and installation, for example, onto a printed circuit board. Additionally, the stacked capacitor array 400 may provide improved mechanical stability and heat dissipation.

In some embodiments, the capacitors 10 of the capacitor array 4000 may be connected in parallel. For example, a first lead frame 4002 may connect each first active termination 16, and a second lead frame 4004 may connect each second active termination 18. A first single lead 4006 may connect each first DC bias termination 30, and a second single lead 4008 may connect each second DC bias termination 32. In some embodiments, the DC bias terminations 30, 32 may wrap around the sides of the capacitor as illustrated in FIGS. 16B and 16C. This configuration may provide improved mechanical and/or electrical connection between the DC bias terminations 30, 32 and the respective bias electrodes to which each bias termination 30, 32 is connected. Additionally, such a configuration may provide improved electrical connection between the various first DC bias terminations 30 and the various second DC bias terminations 32 of adjacent capacitors 10. This may provide a more resilient array 4000.

In other embodiments, the DC bias terminations 30, 32 may be provided only on the side surfaces of the capacitors 10 as illustrated in FIG. 16A. Such a configuration may allow the capacitors 10 to be more closely arranged in the array 4000, resulting in a more compact array 4000, for example.

A DC bias voltage may be applied to each of the capacitors 10 within the array 4000 by applying the DC bias voltage across the first and second single leads 4006, 4008. The single leads 4006, 4008 are omitted from FIGS. 16A and 16B for clarity. Each of the first and second lead frames 4002, 4004 may include a plurality of leads 4010 extending from the capacitor array 4000 for connection in a circuit, for example, to a printed circuit board. In some embodiments, the leads 4010 may be straight as illustrated in FIG. 16A, and in other embodiments, the leads 4010 may be curved outward in a "J" configuration, as illustrated in FIG. 16B. In yet other embodiments, the leads 4010 may be curved inward or have any other suitable configuration for mounting.

The tunable multilayer capacitor array 4000 may have a length 4012 in a lengthwise direction 4014, a width 4016 in a widthwise direction 4018, and a height 4020 in a heightwise direction 4022. Each capacitor 10 may be arranged in a "horizontal stack" configuration such that a thickness of each of plurality of the tunable multilayer capacitors 10 extends in the lengthwise direction 4014 of the array 4000. As illustrated in FIGS. 16A and 16B, the height 4020 of the array 4000 may include a gap distance 4021 between the array 4000 and a surface to which the array 4000 is mounted (illustrated by a dotted line). The gap distance 4021 may be measured between the bottom surface of the array 400 (including the termination 32) and the surface to which the array 4000 is mounted. The lead frames 4002, 4004 may support the array 4000 above the surface. The gap distance 4021 may help to thermally isolate the array 4000 from the surface and/or mechanically de-couple the array 4000 from strain in the surface.

Figure 17A:
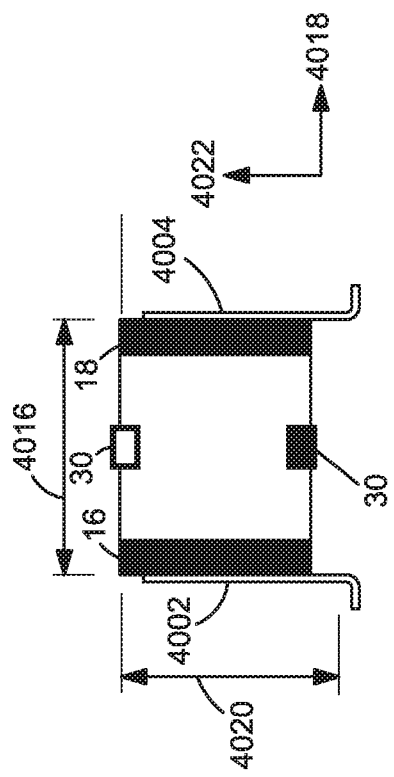
FIGS. 17A through 17C illustrate, respectively, a side view, a front view, and a perspective view of an embodiment of a partially tunable multilayer capacitor array in accordance with aspects of the presently disclosed subject matter.
Figure 17B:
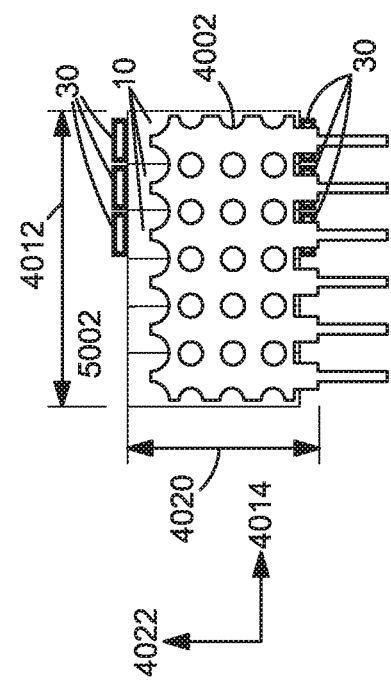
Figure 17C:
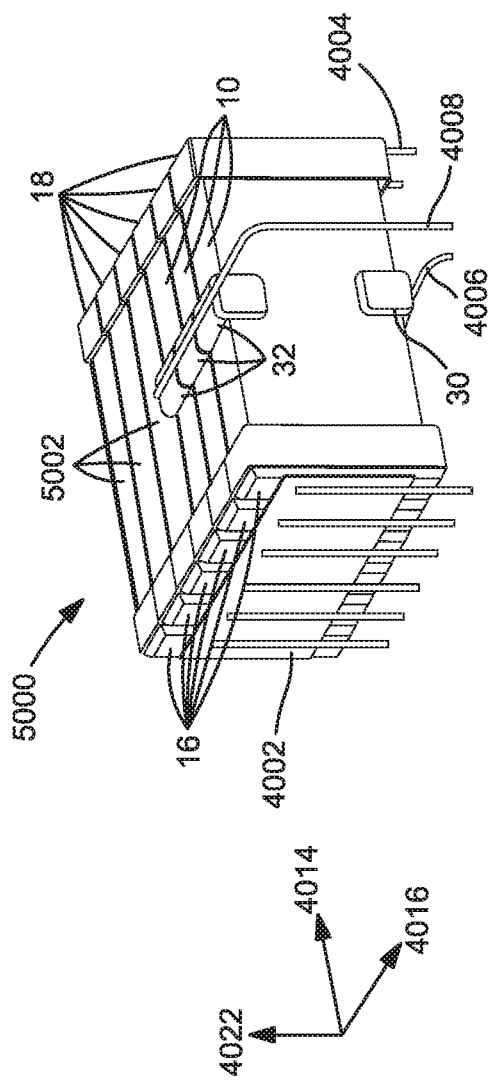

Referring to FIGS. 17A through 17C, a partially tunable multilayer capacitor array 5000 may be formed by arranging both tunable multilayer capacitors 10 and non-tunable capacitors 5002, i.e., capacitors that do not have tuning abilities, in a "horizontal stack" configuration. Similar to the embodiment illustrated in FIGS. 16A through 16C, the partially tunable multilayer capacitor array 5000 may include a first lead frame 4002 that connects each first active termination 16 of the tunable multilayer capacitors 10, and a second lead frame 4004 that connects each second active termination 19 of the tunable multilayer capacitors 10. Additionally, a first single lead 4006 may connect each first DC bias termination 30 of the tunable multilayer capacitors 10, and a second single lead 4008 may connect each second DC bias termination 32 of the tunable multilayer capacitors 10. The single leads 4006, 4008 are omitted from FIGS. 17A and 17B for clarity. Similar to the array 4000 described with reference to FIGS. 16A through 16C, the tunable capacitors 10 of the partially tunable array 5000 may include DC bias terminations 30, 32 that are wrapped around the sides of the capacitors 10 as illustrated in FIGS. 17B and 17C. In other embodiments, the DC bias terminations 30, 32 may be deposited only on the side surfaces of the tunable capacitors, for example, as illustrated in FIG. 17A.

The partially tunable multilayer capacitor array 5000 may provide improved tuning resolution, or precision, in a manner similar to the partially tunable multilayer capacitor 400 described above with reference to FIGS. 13A and 13B. The non-tunable capacitors 5002 may increase the minimum capacitance of the array 5000 when a maximum DC bias voltage is applied across the DC bias electrodes 30, 32 of the array using the single leads 4006, 4008.

Referring to FIGS. 18A through 18C, in some embodiments, a bottom-terminated array 6000 may be formed having first and second DC bias terminations 30, 32 arranged along a bottom surface of the array 6000. For example, each capacitor 10 may have respective first and second DC bias terminations 30, 32 that are arranged along the same side. In other embodiments, the DC bias terminations 30, 32 may both be disposed along the top surface of the array 4000. The DC bias terminations 30, 32 may have any suitable configuration, however.

The configuration illustrated in FIGS. 18A through 18C may provide advantages, including, for example, easier installation, improved mechanical durability etc. For instance, the DC bias terminations 30, 32 may be more easily connected with respective terminations on a surface to which the array 400 is mounted, e.g., a printed circuit board. In some embodiments, single leads 4006, 4008 may connect the respective DC bias terminations 30, 32 with respective terminations on the mounting surface. In other embodiments, however, the DC bias terminations may be directly connected with respective terminations on the mounting surface by, e.g., soldering, without using single leads 4006, 4008.

Additionally, the bottom-terminated configuration described above may be employed to form a partially tuned capacitor array in a manner similar to the embodiment described with reference to FIGS. 17A through 17C. For example, in some embodiments, a combination of bottom-terminated tunable capacitors 10 may be connected in parallel with non-tunable capacitors 5002, in a manner similar to the partially tunable array 5000 described above with reference to FIGS. 17A through 17C.

In other embodiments, a first set of tunable capacitors 10 that have DC bias terminations 30, 32 arranged on opposing side surfaces, for example as illustrated in FIGS. 16A through 16C, may be used to form an array with a second set of tunable capacitors 10 that have DC bias terminations 30, 32 arranged on the same side surface (e.g., on the bottom surface), for example as illustrated in FIG. 18A-18C. Such a configuration may allow for a first DC bias voltage to be applied to the first set of tunable capacitors 10 and a second DC bias voltage that is different than the first DC bias voltage to be applied to the second set of tunable capacitors 10. This may provide a tunable array 4000 that can be tuned based on two different DC bias voltages. In yet other embodiments, a first set of tunable capacitors 10 that have DC bias terminations 30, 32 arranged on a bottom surface can be connected into an array with a second set of tunable capacitors 10 that have DC bias terminations 30, 32 arranged on a top surface, for example. This configuration may also allow for a first DC bias voltage to be applied to the first set of tunable capacitors 10 and a second DC bias voltage that is different than the first DC bias voltage to be applied to the second set of tunable capacitors 10. This may provide a tunable array 4000 that can be tuned based on two different DC bias voltages.

One of ordinary skill in the art would understand that yet other combinations of tunable capacitors having various configurations as described and illustrated herein are possible to form additional arrays beyond those particularly described herein. Similarly, yet other combinations of tunable and non-tunable capacitors having configuration as described and illustrated herein are possible.

Figure 19:
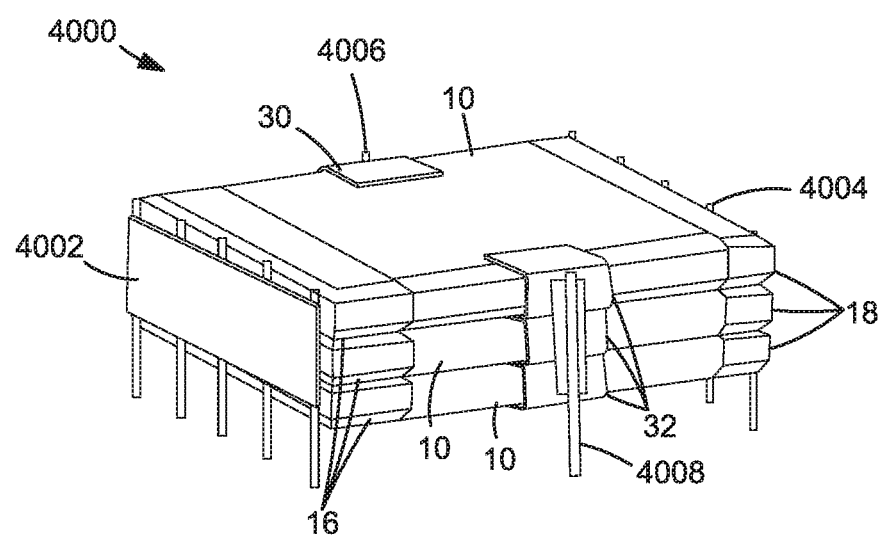
FIG. 19 illustrates a perspective view of an embodiment of a tunable multilayer capacitor array in accordance with aspects of the presently disclosed subject matter.

Referring to FIG. 19, in some embodiments, the capacitor array 4000 may have a vertical stack configuration. The vertical stack capacitor array 4000 may similarly have a first lead frame 4002 connected with some or all of the first active termination 16 and a second lead frame 4004 may connected with some or all of the second active termination 18. A first single lead 4006 may connect some or all first DC bias termination 30, and a second single lead 4008 may connect some or all of the second DC bias termination 32. Thus, the vertical stack capacitor array 4000 may be configured as a fully tunable capacitor array in some embodiments, and as a partially tunable capacitor array in other embodiments. In some embodiments, a vertical stack array may be formed having both bias terminations 30, 32 on the same side, for example using a tunable capacitor 10 configured as the capacitors 10 described above with reference to the bottom-terminated tunable array illustrated in FIGS. 18A through 18C. Similarly combinations of different tunable and/or non-tunable capacitors may be combined into a vertical stack array 4000 as described above with reference to the horizontal stack arrays 4000, 5000.

The horizontal stack configuration may described above with reference to FIGS. 12 through 14 may provide improved mechanical stability for capacitor arrays including a large number of capacitors. For example, for arrays including greater than five capacitors, the height of the vertical stack array may become impractical for mounting to the surface of a printed circuit board, for example. Additionally, the height of such an array may cause the array to become mechanically unstable. However, for arrays having a small number of capacitors, for example five or less capacitors, the vertical stack array may provide a smaller footprint and lower profile.

III. Applications

The controller and/or system for tuning a voltage tunable capacitor as described herein may be employed in a wide variety of applications, including, for example, power conversion circuits. Tunability at high capacitance and voltage may allow for optimization of the performance of the circuit. Additional applications may include point-of-load filter circuits and smoothing capacitors in variable load circuits.

Other suitable applications may include, for instance, waveguides, RF applications (e.g., delay lines), antenna structures, matching networks, resonant circuits, and other applications.

Test Methods

Capacitance

The capacitance may be measured according to MIL-STD-202 Method 305, using a Keithley 3330 Precision LCZ meter with a DC bias of 0.0 volts, 1.1 volts, or 2.1 volts (1 volt root-mean-squared sinusoidal signal). The operating frequency is 1 KHz, and the temperature is about 25° C. The relative humidity may be 25% or 85%.

Equivalent Series Resistance (ESR)

Equivalence series resistance may be measured using a Keithley 2400, 2602, or 3330 Precision LCZ meter with a DC bias of 0.0 volts, 1.1 volts, or 2.1 volts (0.5 volt peak-to-peak sinusoidal signal) at an operating frequency of 10 KHz, 50 KHz, or 100 KHz. A variety of temperature and relative humidity levels may be tested. For example, the temperature may be 23° C., 85° C. or 105° C., and the relative humidity may be 25% or 85%.

Example Capacitor Array

The controller and/or system may be used to tune a capacitor array. Example tunable multilayer capacitor arrays in accordance with aspects of the present disclosure are provided in Table 1:

TABLE 1

Example Tunable Multilayer Capacitor Arrays

| Initial Capacitance (µF) | Number of Capacitors | Operating Voltage (volts) | Maximum DC Bias Voltage (volts) |
| --- | --- | --- | --- |
| 8.2 | 3 | 100 | 100 |
| 12 | 5 | 100 | 100 |
| 14 | 3 | 100 | 100 |
| 18 | 3 | 50 | 50 |
| 22 | 10 | 100 | 100 |
| 22 | 5 | 100 | 100 |
| 27 | 5 | 50 | 50 |
| 27 | 3 | 50 | 50 |
| 47 | 5 | 50 | 50 |
| 47 | 10 | 100 | 100 |
| 50 | 10 | 50 | 50 |
| 68 | 3 | 25 | 25 |
| 100 | 5 | 25 | 25 |
| 100 | 10 | 50 | 50 |
| 220 | 10 | 25 | 25 |

The initial capacitance listed in Table 1 may be the capacitance of the array with no DC bias voltage applied. The arrays may be tunable from about 10% to about 95% of the initial capacitance.

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. A controller for tuning a voltage tunable capacitor, the controller comprising:
at least one analog-to-digital converter configured to receive at least one input signal and convert the at least one input signal into at least one digital signal;
a processor configured to process the at least one digital signal using logic to generate an output signal; and
a charge pump configured to boost the output signal to generate a boosted output signal;
wherein the controller is configured to provide the boosted output signal to the voltage tunable capacitor to adjust a bias voltage of the voltage tunable capacitor, and
wherein the at least one input signal ranges from about 0 volts to at least about 5 volts.

2. The controller of claim 1, wherein the controller is configured to adjust the bias voltage from about 0 volts to at least about 50 volts.

3. The controller of claim 1, wherein the boosted output signal adjusts a capacitance of the voltage tunable capacitor.

4. The controller of claim 1, wherein the at least one input signal is indicative of at least one of a voltage, a current, or a capacitance.

5. The controller of claim 1, wherein the at least one input signal is indicative of a capacitance associated with the voltage tunable capacitor.

6. The controller of claim 1, wherein the at least one input signal is indicative of a temperature.

7. The controller of claim 1, wherein at least one input signal comprises at least two input signals.

8. The controller of claim 1, wherein the at least one input signal comprises a manual control signal indicative of at least one of a desired capacitance or a desired voltage associated with the voltage tunable capacitor.

9. The controller of claim 8, wherein the manual control signal ranges from about 0 volts to at least about 3 volts.

10. A system for tuning a voltage tunable capacitor, comprising:
one or more control devices comprising a charge pump;
a voltage tunable capacitor comprising a plurality of active electrodes, a plurality of bias electrodes, and a plurality of dielectric layers disposed between the pluralities of active electrodes and bias electrodes, and wherein at least some of the dielectric layers contain a tunable dielectric material that exhibits a variable dielectric constant upon the application of an applied voltage;
wherein the one or more control devices are configured to:
receive at least one input signal;
process the at least one input signal to generate an output signal using logic;
boost the output signal using the charge pump; and
provide the boosted output signal to the voltage tunable capacitor to adjust a bias voltage applied across the plurality of bias electrodes,
wherein the at least one input signal comprises a manual control signal indicative of at least one of a desired capacitance or a desired voltage associated with the voltage tunable capacitor, and
wherein the manual control signal ranges from about 0 volts to at least about 3 volts.

11. The system of claim 10, wherein the one or more control devices are configured to provide the output signal so as to adjust the bias voltage from about 0 volts to at least about 50 volts.

12. The system of claim 10, wherein the boosted output signal adjusts a capacitance of the voltage tunable capacitor.

13. The system of claim 10, wherein the at least one input signal is indicative of at least one of a voltage, a current, or a capacitance.

14. The system of claim 10, wherein the at least one input signal is indicative of a capacitance associated with the voltage tunable capacitor.

15. The system of claim 10, wherein the at least one input signal is indicative of a temperature.

16. The system of claim 10, wherein the at least one input signal comprises at least two input signals.

17. The system of claim 10, wherein the one or more control devices further comprise an analog-to-digital converter configured to generate a digital signal from the input signal, and wherein processing the input signal comprises processing the digital signal.

18. The system of claim 10, wherein the tunable dielectric material has a voltage tunability coefficient of from about 10% to about 90%, wherein the voltage tunability coefficient is determined according to the following general equation:

$$T = 100 \times (\varepsilon 0 - \varepsilon V)/\varepsilon 0$$

wherein,

T is the voltage tunability coefficient;

ε0 is the static dielectric constant of the material without an applied voltage; and εV is the variable dielectric constant of the material after application of an applied voltage (DC).

19. The system of claim 10, wherein a static dielectric constant of the dielectric material ranges from about 100 to about 10,000 as determined in accordance with ASTM D2149-13 at an operating temperature of 25° C. and frequency of 1 kHz.

20. The system of claim 10, wherein the voltage tunable capacitor is capable of being tuned to a capacitance value of about 100 pF or more.

21. The system of claim 10, wherein the voltage tunable capacitor is capable of being tuned to a capacitance value of less than about 100 pF.

22. The system of claim 10, wherein the one or more control devices are assembled in a monolithic device.

23. The system of claim 10, wherein the voltage tunable capacitor further comprises a first active terminal, a second active terminal, a first bias terminal, and a second bias terminal, and wherein:

the plurality of active electrodes comprises a plurality of first active electrodes electrically connected with the first active terminal;

the plurality of active electrodes comprises a plurality of second active electrodes electrically connected with the second active terminal;

the plurality of bias electrodes comprises a plurality of first bias electrodes electrically connected with the first bias terminal; and the plurality of bias electrodes comprises a plurality of second bias electrodes electrically connected with the second bias terminal.

24. The system of claim 10, wherein thicknesses of the plurality of dielectric layers range from about 0.5 micrometers to about 15 micrometers.

25. The system of claim 10, wherein thicknesses of the plurality of dielectric layers range from about 15 micrometers to about 150 micrometers.

26. A method for controlling a voltage tunable capacitor, the method comprising:

receiving at least one input signal;

converting the at least one input signal into at least one digital signal;

processing the at least one digital signal using logic to generate an output signal;

boosting the output signal using a charge pump to generate a boosted output signal; and providing the boosted output signal to the voltage tunable capacitor to adjust a bias voltage of the voltage tunable capacitor, wherein the at least one input signal ranges from about 0 volts to at least about 5 volts.

* * * * *